(12) United States Patent
Funk et al.

(10) Patent No.: US 12,072,875 B2
(45) Date of Patent: *Aug. 27, 2024

(54) SYSTEM AND METHOD FOR IDENTIFYING AVAILABILITY OF MEDIA ITEMS

(71) Applicant: Google LLC, Mountain View, CA (US)

(72) Inventors: Gregory Allan Funk, San Francisco, CA (US); Yongsung Kim, Menlo Park, CA (US); Richard Bragg, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,012

(22) Filed: Jan. 30, 2023

(65) Prior Publication Data

US 2023/0177045 A1 Jun. 8, 2023

Related U.S. Application Data

(63) Continuation of application No. 17/181,761, filed on Feb. 22, 2021, now Pat. No. 11,567,931, which is a
(Continued)

(51) Int. Cl.
*G06F 16/242* (2019.01)
*G06F 16/41* (2019.01)
(Continued)

(52) U.S. Cl.
CPC .......... *G06F 16/244* (2019.01); *G06F 16/41* (2019.01); *G06F 16/43* (2019.01); *G06F 16/48* (2019.01)

(58) Field of Classification Search
CPC ........ G06F 16/244; G06F 16/43; G06F 16/41; G06F 16/48; G06F 16/40; G06F 16/432; G06F 16/483; G06F 16/487; G06F 16/489
See application file for complete search history.

(56) References Cited

U.S. PATENT DOCUMENTS

| 7,188,355 B1 | 3/2007 | Prokopenko et al. |
| 8,005,826 B1 | 8/2011 | Sahami et al. |

(Continued)

FOREIGN PATENT DOCUMENTS

| CN | 1432947 | 7/2003 |
| CN | 1845104 | 10/2006 |

(Continued)

OTHER PUBLICATIONS

Extended European Search Report dated Dec. 2, 2015 in EP Patent Application No. 12828372.8.
(Continued)

*Primary Examiner* — Jorge A Casanova
(74) *Attorney, Agent, or Firm* — Brake Hughes Bellermann LLP

(57) ABSTRACT

A system, computer-readable storage medium storing at least one program, and a computer-implemented method for identifying availability of media items is presented. A search query is received from a client device of a user. Instances of media items that satisfy the search query and that are available on content sources accessible to the client device of the user are identified. Aggregate information for the media items is determined based on the instances of the media items. The aggregate information for the media items is transmitted to the client device.

21 Claims, 16 Drawing Sheets

700

702 — Receive a search query from a client device of a user

704 — Identify instances of media items that satisfy the search query and that are available on content sources accessible to the client device of the user 706 — Determine aggregate information for the media items based on the instances of the media items 708 — Transmit the aggregate information for the media items to the client device

Related U.S. Application Data continuation of application No. 14/241,250, filed as application No. PCT/US2012/052366 on Aug. 24, 2012, now Pat. No. 10,929,391.

(60) Provisional application No. 61/528,095, filed on Aug. 26, 2011.

(51) Int. Cl.
 *G06F 16/43* (2019.01)
 *G06F 16/48* (2019.01)

(56) References Cited

U.S. PATENT DOCUMENTS

| | | |
|---|---|---|
| 8,713,592 B2 | 4/2014 | Patterson et al. |
| 9,124,650 B2 | 9/2015 | Maharajh et al. |
| 9,591,339 B1 | 3/2017 | Christie et al. |
| 2005/0071323 A1 | 3/2005 | Gabriel et al. |
| 2006/0195462 A1 | 8/2006 | Rogers |
| 2007/0073728 A1 | 3/2007 | Klein et al. |
| 2007/0077921 A1 | 4/2007 | Hayashi et al. |
| 2007/0078884 A1 | 4/2007 | Ott et al. |
| 2007/0083556 A1 | 4/2007 | Plastina et al. |
| 2007/0118873 A1 | 5/2007 | Houh et al. |
| 2007/0156719 A1 | 7/2007 | Upendran et al. |
| 2007/0161402 A1 | 7/2007 | Ng et al. |
| 2008/0122986 A1 | 5/2008 | Diederichsen |
| 2008/0243788 A1 | 10/2008 | Reztlaff et al. |
| 2008/0307456 A1 | 12/2008 | Beetcher et al. |
| 2008/0313146 A1 | 12/2008 | Wong et al. |
| 2010/0299701 A1 | 11/2010 | Liu et al. |
| 2011/0202430 A1 | 8/2011 | Narayanan et al. |
| 2011/0225156 A1 | 9/2011 | Pavlik |
| 2011/0225417 A1 | 9/2011 | Maharajh et al. |
| 2011/0283175 A1 | 11/2011 | Pettit et al. |
| 2011/0289135 A1 | 11/2011 | Soldan et al. |
| 2011/0321072 A1 | 12/2011 | Patterson et al. |
| 2012/0041941 A1 | 2/2012 | King et al. |
| 2012/0260291 A1 | 10/2012 | Wood |
| 2012/0311638 A1 | 12/2012 | Reyna et al. |
| 2012/0311640 A1 | 12/2012 | Cahnbley et al. |
| 2013/0173639 A1 | 7/2013 | Chandra et al. |

FOREIGN PATENT DOCUMENTS

| | | |
|---|---|---|
| CN | 101263474 | 9/2008 |
| KR | 20080102828 | 11/2008 |
| WO | WO 2008005135 | 1/2008 |

OTHER PUBLICATIONS

International Search Report and Written Opinion dated Mar. 7, 2013 in International Patent Application No. PCT/US2012/052366.
Notice of Allowance dated Aug. 30, 2018 in KR Patent Application No. 10-2014-7008013.
Notice of Allowance dated Sep. 21, 2022 in U.S. Appl. No. 17/181,761.
Notice of Allowance dated Oct. 20, 2020 in U.S. Appl. No. 14/241,250.
Office Action dated Jan. 6, 2020 in CN Patent Application No. 201910015584.2.
Office Action dated Mar. 8, 2017 in U.S. Appl. No. 14/241,250.
Office Action dated May 2, 2022 in U.S. Appl. No. 17/181,761.
Office Action dated May 5, 2020 in U.S. Appl. No. 14/241,250.
Office Action dated May 6, 2020 in CN Patent Application No. 201910015860.5.
Office Action dated Jun. 20, 2018 in KR Patent Application No. 10-2014-7008013.
Office Action dated Jun. 23, 2017 in CN Patent Application No. 201280052148.9.
Office Action dated Jul. 6, 2020 in CN Patent Application No. 201910015584.2.
Office Action dated Aug. 26, 2016 in CN Patent Application No. 201280052148.9.
Office Action dated Sep. 15, 2017 in U.S. Appl. No. 14/241,250.
Office Action dated Sep. 26, 2018 in U.S. Appl. No. 14/241,250.
Office Action dated Dec. 5, 2017 in CN Patent Application No. 201280052148.9.
Office Action dated Dec. 10, 2020 in CN Patent Application No. 201910015584.2.
Office Action dated Dec. 19, 2019 in U.S. Appl. No. 14/241,250.

SYSTEM AND METHOD FOR IDENTIFYING AVAILABILITY OF MEDIA ITEMS

CROSS-REFERENCE TO RELATED APPLICATIONS

This application is a continuation of U.S. patent application Ser. No. 17/181,761, filed Feb. 22, 2021, which is a continuation of U.S. patent application Ser. No. 14/241,250, filed Oct. 27, 2014, which is a United States National Phase Application under 35 U.S.C. § 371 of International Application No. PCT/US2012/052366, filed Aug. 24, 2012, which claims the benefit of U.S. Provisional Patent Application No. 61/528,095, filed Aug. 26, 2011, each of which is hereby incorporated by reference herein in its entirety.

TECHNICAL FIELD

The disclosed embodiments relate generally to identifying availability of media items.

BACKGROUND

When searching for media items, a user typically wants to be able to assess quickly whether the user has access to various media items. However, a particular media item (e.g., an episode of a television series, a movie, a song, etc.) may have different availability through different content sources. Moreover, the user may not have access to all content sources on which the media item is available.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DESCRIPTION OF EXAMPLE EMBODIMENTS

The description that follows includes example systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for identifying availability of media items, as explained in more detail below.

System Architecture

Figure 1:
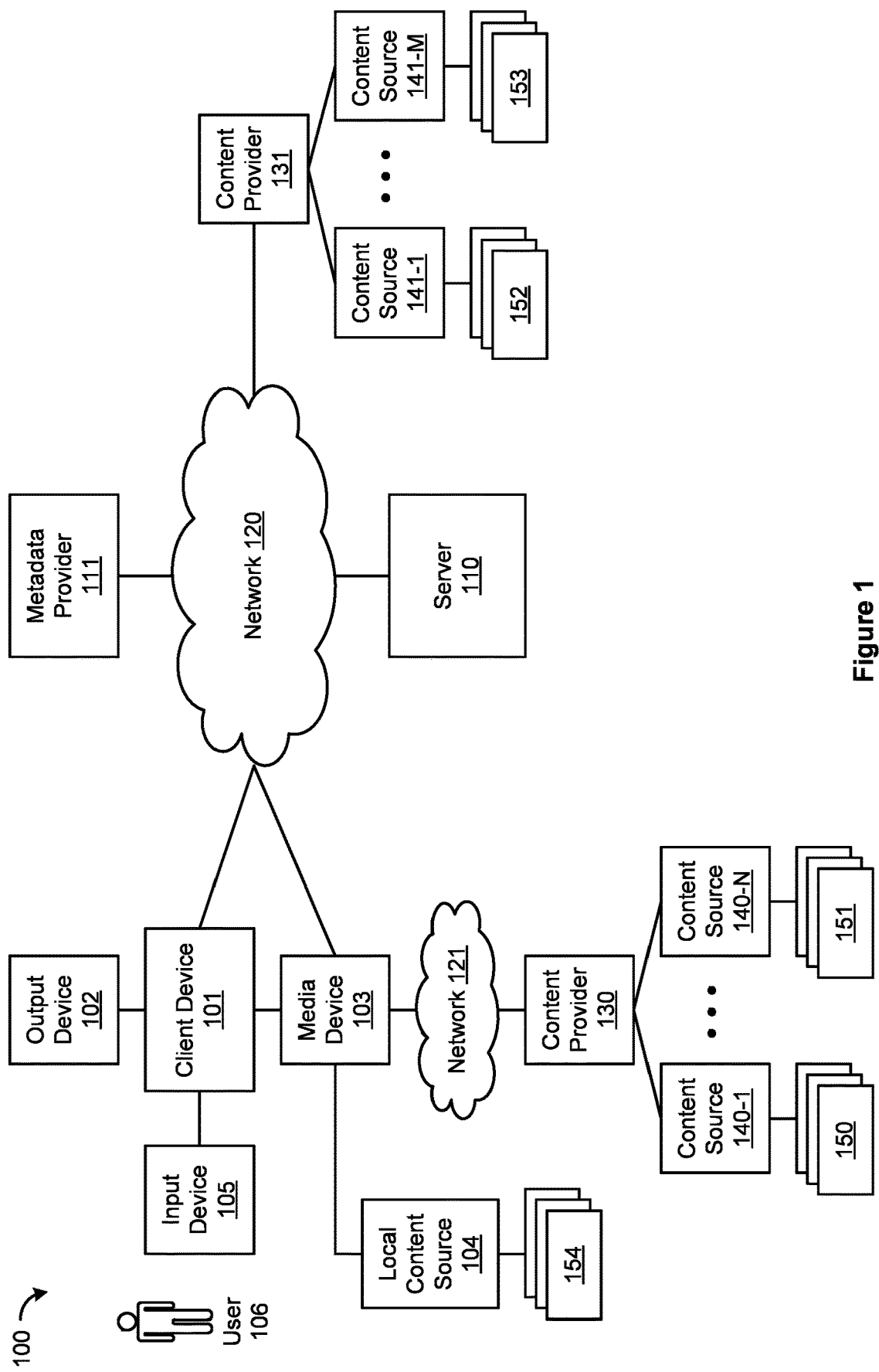
FIG. 1 is a block diagram illustrating an example network system, according to some embodiments.

FIG. 1 is a block diagram illustrating an example network system 100, according to some embodiments. The network system 100 includes a client device 101 coupled to an output device 102, a media device 103, and an input device 105 of a user 106. In some implementations, the client device 101 is a television set top box. In some embodiments, the output device 102 includes one or more of a monitor, a projector, a television, and a speaker.

In some implementations, the client device 101 is an intermediary device that is configured to control devices coupled to the client device 101 (e.g., the media device 103, the output device 102, etc.) and that is configured to provide enhanced multimedia functionality. The enhanced multimedia functionality includes, but is not limited to, providing picture-in-picture capabilities on the output device 102 that allows the user 106 to simultaneously access (e.g., browse and/or otherwise interact with) web sites on the output device 102 (e.g., a television display) while watching and/or listening to an instance of a media item (e.g., a video) being presented in a smaller area of the output device 102, providing a user interface on the output device 102 that allows the user 106 to search for instances of media items that are available on content sources (e.g., a particular television channel, a streaming media service, etc.) that are accessible to the client device 101 of the user 106, and modifying audio and/or video signals received from the media device 103 (e.g., overlaying graphical objects in video stream, inserting audio into an audio stream, etc.) and outputting the modified audio and/or video signals to the output device 102 for presentation to the user 106.

Note that an "instance of a media item" may refer to a particular showing of the media item at a particular date and/or time on a particular content source (e.g., a showing of Episode 1 of the Simpsons at 10 PM on Jan. 3, 2011, on Channel 2 of an over-the-air television service, etc.) or a particular copy of the media item on a particular content source (e.g., Episode 1 of the Simpsons on streaming video service 1 for rent, Episode 1 of the Simpsons on streaming video service 2 for purchase, etc.).

A media item includes, but is not limited to, a movie, a video, a television program (e.g., an episode of a television series, a standalone television program, etc.), a book, an issue of a magazine, an article, a song, and a game.

A content source includes, but is not limited to, a digital video recorder, a satellite radio channel, a over-the-air radio channel, a over-the-air television channel, a satellite television channel, a cable television channel, a cable music channel, an Internet Protocol television channel, and a streaming media service (e.g., a video-on-demand service, a streaming video service, a streaming music service, etc.).

In some implementations, the user 106 uses the input device 105 to instruct the client device 101 to perform various actions with respect to the output device 102 and/or the media device 103. For example, the user 106 may use the input device 105 to instruct the client device 101 to increase the volume of the output device 102. Similarly, the user 106 may use the input device 105 to instruct the client device 101 to instruct the media device 103 to obtain instances of media items. Furthermore, the user 106 may use the input device 105 to instruct the client device 101 to search for instances of media items satisfying a search query. The interactions between the user 106, the client device 101, the output device 102, and the media device 103 are described in more detail with reference to FIGS. 3 and 4.

The input device 105 includes, but is not limited to, a pointing device (e.g., a mouse, a trackpad, a touchpad, a free space pointing device), a keyboard, a touch-sensitive display device (e.g., a touch-screen display and/or controller), a remote controller, a smart phone including a remote controller application, and a visual gesture recognition system (e.g., a system that captures and recognizes motions and/or gestures of a user and translates the motions and/or gestures into input commands).

In some embodiments, the media device 103 is configured to obtain instances of media items from a content source and provide audio and/or video signals to be presented to the user 106 using the output device 102.

In some embodiments, the media device 103 obtains instances of media items (e.g., instances of media items 154) from a local content source 104. In some implementations, the local content source 104 includes one or more of a digital video recorder of the media device 103, a hard disk drive of the media device 103, and a network storage device accessible by the media device 103.

In some embodiments, the media device 103 obtains instances of media items (e.g., instances of media items 150 and 151) from content sources 140 provided by a content provider 130 via network 121. A "content provider" is an entity or a service that provides one or more content sources and a "content source" is a source of instances of media items (e.g., a television channel, a radio channel, a web site, a streaming media service, etc.). In some implementations, network 121 includes one or more of a cable television service, a satellite television service, a satellite radio service, an over-the-air television service, an over-the-air radio service, and a data network (e.g., network 120, the Internet, a virtual private network, etc.).

In some embodiments, the media device 103 obtains instances of media items (e.g., instances of media items 152 and 153) from content sources 141 provided by a content provider 131 via network 120. In some implementations, the content provider 131 is a streaming media service (e.g., a streaming video service, a streaming audio service, etc.). Network 120 can generally include any type of wired or wireless communication channel capable of coupling together computing nodes. This includes, but is not limited to, a local area network, a wide area network, or a combination of networks. In some embodiments, network 120 includes the Internet.

In general, the media device 103 may obtain instances of media items from any combination of: local content sources, content sources available via network 121, and content sources available via network 120.

In some embodiments, the media device 103 includes a physical device. The physical device includes, but is not limited to, a digital video recorder, a satellite radio set top box, an over-the-air radio tuner, an over-the-air television tuner, a satellite television set top box, a cable television set top box, an Internet Protocol television set top box, and a game console.

In some embodiments, the media device 103 includes a virtual device (e.g., a software module) executing on the client device 101. The virtual device includes, but is not limited to, a web browser executing on the client device 101 and a streaming media application executing on the client device 101.

In general, the media device 103 may include any combination of physical devices and virtual devices.

In some embodiments, the network system 100 includes a server 110 coupled to network 120. In these embodiments, the server 110 obtains metadata for instances of media items from a metadata provider 111 and/or from web sites on the Internet, builds a database of media items based on the metadata for the instances of the media items, and returns information relating to instances of media items satisfying search queries and that are available on content sources accessible to the client device 101. A content source that is accessible to the client device 101 (of a user 106) includes a content source for which the client device 101 has a subscription (e.g., a cable or satellite television channel, a streaming media service, etc.) a content source for which the client device 101 has an appropriate media device to receive media items from the content source (e.g., an over-the-air television or radio tuner, a network interface device, an application for a streaming media service, etc.), and a content source for which the client device 101 has purchased rights to obtain media items (e.g., a video-on-demand service, a video rental service, etc.). Note that the client device 101 may only be able to access a particular set of content sources. For example, the client device 101 may only have access to particular channels on a cable television service. Similarly, the client device 101 may have access to a first streaming media service, but not a second streaming media service. Thus, it is beneficial to provide the user 106 only with information for instances of media items that are available on content sources accessible to the client device 101.

The metadata for an instances of a media item include, but are not limited to, a content source on which the instance of the media item is available, dates and times when the instance of the media item is available, actors associated with the instance of the media item, musicians associated with the instance of the media item, producers associated with the instance of the media item, directors associated with the instance of the media item, a synopsis of the instance of the media item, a first air date of the instance of the media item, a series for which the instance of the media item is a member (e.g., a television series, etc.), a genre (e.g., comedy, drama, game show, horror, suspense, reality, etc.) of the instance of the media item, and a cost of the instance of the media item.

The information relating to an instance of the media item include, but are not limited to, at least a subset of the metadata for the instance of the media item, links to content relating to the media item (e.g., a link to an a web page of an actor appearing in the media item, etc.), and content relating to the media item that is obtained from another database (e.g., a proprietary database) and/or from web pages including content related to the media item (e.g., a web page for a television program, a web page for an actor, etc.).

In some implementations, previous queries and search results are stored in a cache to speed up query responses. The previous queries and search results may be periodically removed from the cache to ensure that the cache is not storing search results for instances of media items that are no longer available (e.g., a show time of an episode of a television series may have passed since information relating to the instance of the episode was stored in the cache).

The server 110 is described in more detail below with reference to FIG. 2.

Note that although FIG. 1 illustrates that the client device 101 is coupled to one media device (e.g., the media device 103), one output device (e.g., the output device 102), and one input device (e.g., the input device 105), the client device 101 may be coupled to multiple media devices, multiple output devices, and multiple input devices. Similarly, although FIG. 1 illustrates one client device (e.g., the client device 101) and one metadata provider (e.g., metadata provider 111), the network system 100 may include multiple client devices and metadata providers. Moreover, although FIG. 1 illustrates one content provider (e.g., the content provider 130) coupled to network 121 and one content provider (e.g., the content provider 131) coupled to network 120, multiple content providers may be coupled to each network.

Furthermore, although FIG. 1 shows one instance of the server 110, multiple servers may be present in the network system 100. For example, the server 110 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

The client device 101 is described in more detail below with reference to FIGS. 3, 4, and 6. The server 110 is described in more detail below with reference to FIGS. 2 and 5.

Figure 2:
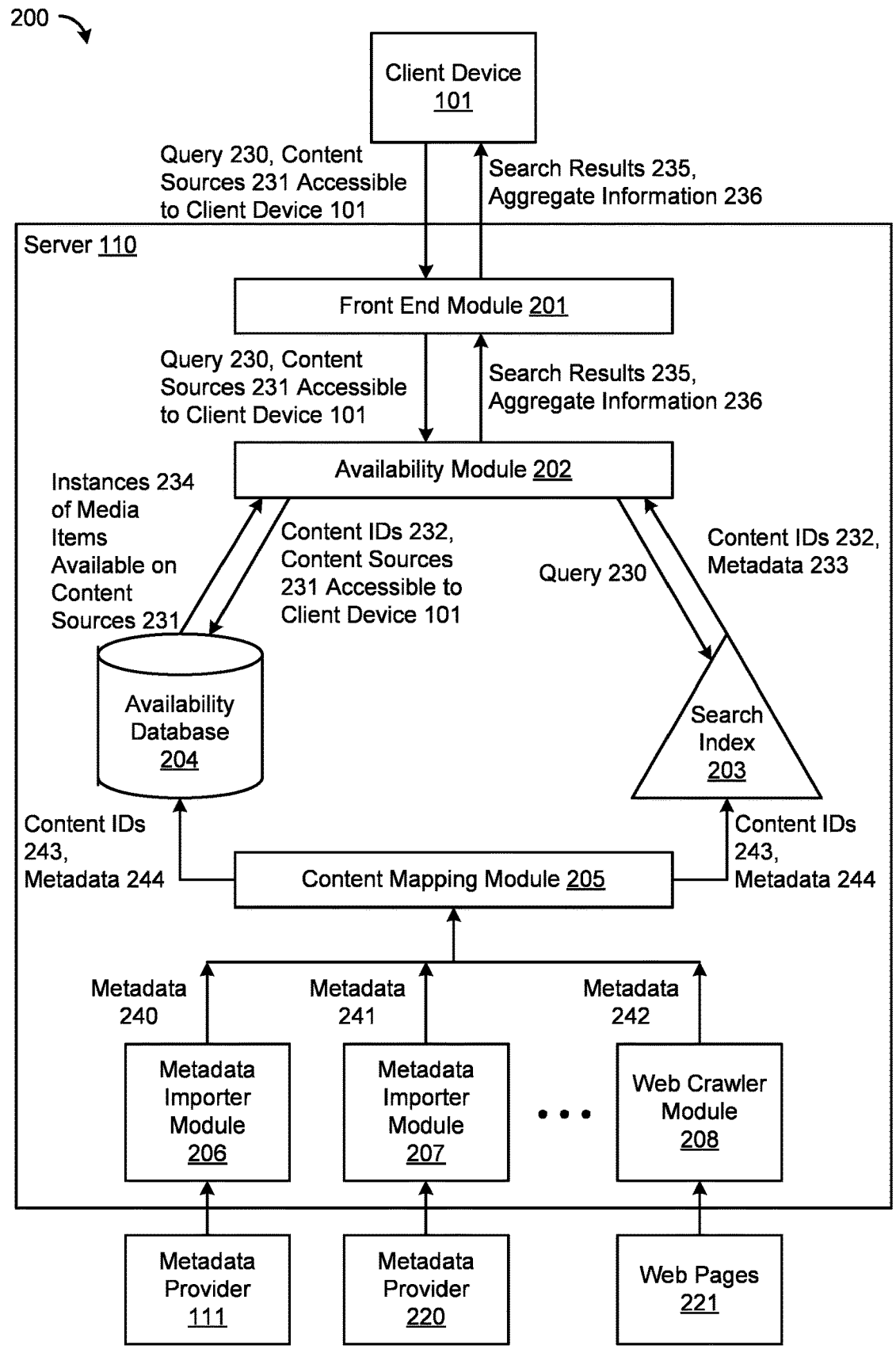
FIG. 2 is a block diagram illustrating example modules of a server, according to some embodiments.

FIG. 2 is a block diagram illustrating example modules of the server 110, according to some embodiments. The server 110 includes a front end module 201, an availability module 202, a content mapping module 205, metadata importer modules 206-207, and a web crawler module 208. The front end module 201 provides an interface between the modules of server 110 and the client device 101. The availability module 202 identifies instances of media items that satisfy a search query received from the client device 101 and that are available on content sources that are accessible to the client device 101. As discussed above, the client device 101 may be only able to access a particular set of content sources. Thus, it is beneficial to provide the user 106 only with information for instances of media items that are available on content sources accessible to the client device 101. The content mapping module 205 processes metadata obtained by the metadata importer modules 206-207 and the web crawler module 208 to generate a search index 203 and an availability database 204.

The following discussion illustrates an example process for importing metadata for instances of media items. The metadata importer modules 206-207 obtain metadata 240 and 241 for instances of media items from metadata providers 111 and 220, respectively. In some implementations, the server 110 includes a metadata importer module for each metadata provider. The web crawler module 208 imports and processes web pages 221 to produce metadata 242 for instances of media items. The metadata 240, 241 and 242 may include duplicate information. For example, the metadata provider 111 and the metadata provider 220 may both provide metadata for instances of media items available from a particular cable television service. However, each metadata provider may use different identifiers for the instances of the media items available from the particular cable television service. Thus, in some embodiments, the content mapping module 205 analyzes the metadata 240, 241, and 242 for the instances of the media items to identify unique media items. For example, the content mapping module 205 identify unique media items by grouping instances of media items for which a predetermined subset of the metadata for the instances of the media items match (e.g., a group of instances of media items is formed when the series name, the episode number, and the actors match for each of the instances of the media items in the group, etc.). The content mapping module 205 then generates content identifiers 243 for each unique media item and generates metadata 244 for the unique media items. In some embodiments, a content identifier includes an identifier for a series of related media items (e.g., a content identifier for a television series) and an identifier for a media item (e.g., a content identifier for an episode of the television series). The metadata 244 for a unique media item includes, but is not limited to, the content identifier 243 for the unique media item, at least a subset of the metadata 240, 241, and 242 for each instance of the unique media item. For example, Episode 1 of "The Simpsons" may have 6 instances across various content sources. The content mapping module 205 may assign a content identifier 243 having a value of "1" to Episode 1 of "The Simpsons" and may include metadata for each instance of Episode 1 of "The Simpsons." The content mapping module 205 uses the content identifiers 243 and the metadata 244 for the instances of the unique media items to generate a search index 203 that is used to efficiently identify content identifiers 243 for media items. The content mapping module 205 also uses the content identifiers 243 and the metadata 244 for the instances of the unique media items to generate an availability database 204 that is indexed by the content identifiers 243 and content sources on which the corresponding instances of the media items are available.

The following discussion illustrates an example process for responding to a search query from the client device 101. The front end module 201 receives a search query 230 from the client device 101 and dispatches the search query 230 to the availability module 202. Prior to dispatching the search query 230 to the availability module 202, the front end module 201 optionally normalizes and expands the search query 230. The front end module 201 optionally receives information relating to content sources 231 accessible to the client device 101 from the client device 101. Alternatively, the availability module 202 obtains the information relating to content sources 231 accessible to the client device 101 from a database (e.g., a profile of the user 106 of the client device 101, a profile for the client device 101, etc.). The availability module 202 queries the search index 203 using the search query 230 to obtain content identifiers 232 and metadata 233 for instances of media items that satisfy the search query 230. The availability module 202 then queries the availability database 204 using the content identifiers 232 and content sources 231 accessible to the client device 101 to obtain instances 234 of media items that are available on content sources 231 accessible to the client device 101. In other words, the instances 234 of media items are both (1) available on content sources 231 accessible to the client device 101 and (2) satisfy the search query 230.

The availability module 202 then generates search results 235 and aggregate information 236 based on the metadata 233 and the instances 234 of media items that are available on content sources 231 accessible to the client device 101. In some implementations the search results 235 include information relating to the instances 234 of media items (e.g., a name and/or an episode number for episodes of a television series, a name of a television series, a name of movie, etc.) and the aggregate information 236 corresponding to the unique media items. The aggregate information 236 of a media item includes, but is not limited to, a number of episodes of a series that are available on content sources 231 accessible to the client device 101, a most recent instance of the media item that is available on content sources 231 accessible to the client device 101 (e.g., an upcoming new episode, a newest episode that was previously aired, etc.), an oldest instance of the media item that is available on content sources 231 accessible to the client device 101 (e.g., a pilot episode, etc.), a completeness of the instances of the media item that are available on content sources 231 accessible to the client device 101 (e.g., all episodes are available), a number of unique content sources 231 on which the instances of the media item is accessible to the client device 101, a content source 231 that is most frequently selected, time periods during which the media item is available on the content sources 231, a future time at which the media item will available on the content sources 231, a remaining time that the media item is accessible on the content source 231, a date when the media item was purchased.

The availability module 202 then returns the search results 235 and/or the aggregate information 236 to the client device 101 via the front end module 201.

In some embodiments, the modules of the server 110 are included in the client device 101 to facilitate searching of media items stored in the local content source 104.

Figure 3:
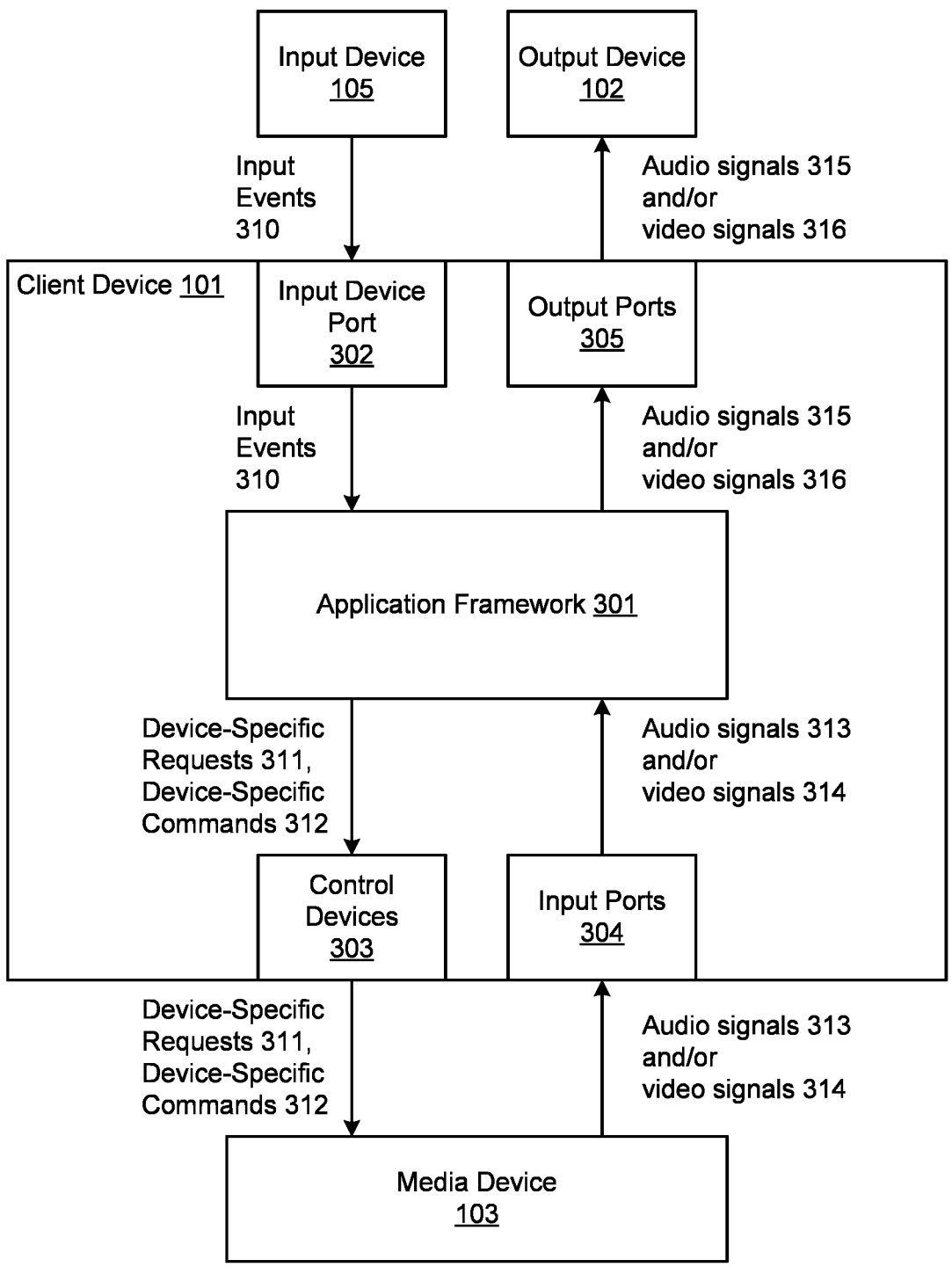
FIG. 3 is a block diagram illustrating example modules of a client device, according to some embodiments.

FIG. 3 is a block diagram illustrating example modules of the client device 101, according to some embodiments. In some implementations the client device 101 includes an application framework 301 that control devices 303 coupled to the client device 101 (e.g., the media device 103, the output device 102, etc.) in response to input events received from the input device 105 and that is configured to provide enhanced multimedia functionality (e.g., as described above with reference to FIG. 1). The application framework 301 is described in more detail below with reference to FIG. 4.

In some implementations, the client device 101 includes an input device port 302, control devices 303, input ports 304, and output ports 305. The input device port 302 receives input events from the input device 105. The control devices 303 transmit device-specific requests and/or device-specific commands to the media device 103 and/or the output device 102. In some implementations, the control devices 303 include one or more of an infrared transceiver, a serial interface device, a Bluetooth transceiver, and a network interface device. The input ports 304 receive audio signals and/or video signals from the media device 103. The output ports 305 transmit audio signals and/or video signals to the output device 102. In some implementations the input ports 304 and the output ports 305 include one or more of a universal serial bus (USB) port, a Bluetooth transceiver, an Ethernet port, a Wi-Fi transceiver, an HDMI port, a DisplayPort port, a Thunderbolt port, a composite video port, a component video port, an optical port, and an RCA audio port.

In some implementations the output device 102 is integrated with the client device 101. For example, the client device 101 and the output device 102 may be included in the same housing (e.g., a television set).

The following discussion illustrates an example process for processing requests and/or commands received from the input device 105. The application framework 301 receives input events 310 from the input device 105 via the input device port 302. The input events 310 include, but are not limited to, key presses, pointer positions, pointing device button presses, scroll wheel positions, gestures, and selections of graphical user interface (GUI) objects (e.g., links, images, etc.).

One or more of the input events 310 may correspond to a device-agnostic request and/or a device-agnostic command. A device-agnostic request (e.g., a request to acquire a media device, a request to obtain instances of media items, etc.) is a generic request that may be issued to a plurality of devices regardless of the device-specific syntax of requests for the plurality of particular devices. Similarly, a device-agnostic command (e.g., a command to increase a volume level, a command to change a channel, etc.) is a generic command that may be issued to a plurality of devices regardless of the device-specific syntax of requests for the plurality of particular devices.

The application framework 301 maps device-agnostic requests to device-specific requests 311 for the media device 103. Similarly, the application framework 301 maps device-agnostic commands to device-specific commands 312 for the media device 103. The application framework transmits the device-specific requests 311 and/or the device-specific commands 312 to the media device 103 using the control devices 303.

In response to the device-specific requests 311 and/or the device-specific commands 312, the media device 103 transmits audio signals 313 and/or video signals 314 that the application framework 301 receives via the input ports 304.

The application framework 301 then generates audio signals 315 and/or video signals 316 using the audio signals 313 and/or video signals 314 to provide enhanced multimedia functionality (e.g., overlaying a GUI on the video signals 314, overlaying audio on the audio signals 313).

The application framework 301 then transmits the audio signals 315 and/or the video signals 316 to the output device 102 using the output ports 305.

In some implementations, the application framework 301 facilitates web searches and/or web browsing through a GUI that is displayed on the output device 102.

Figure 4:
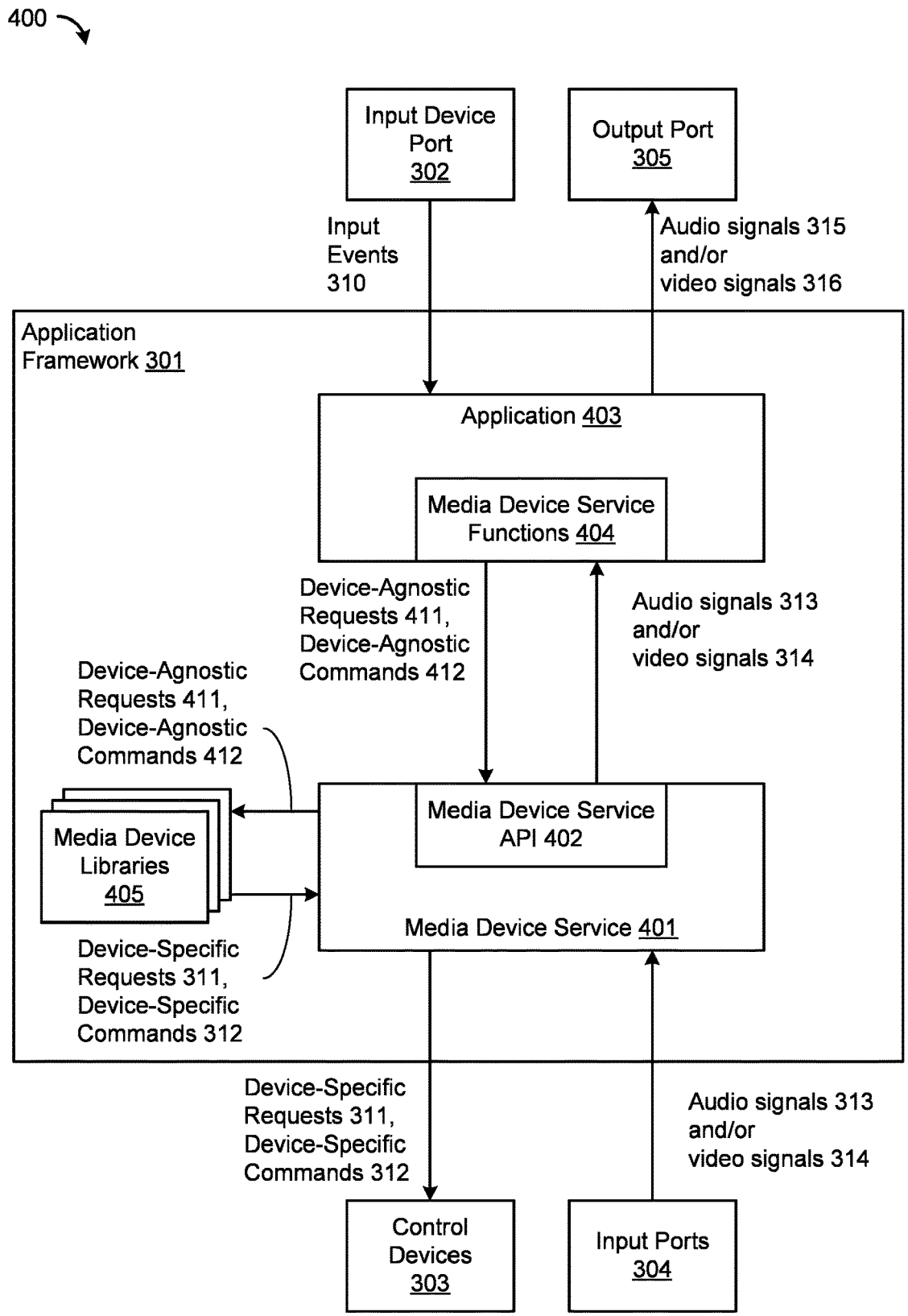
FIG. 4 is a block diagram illustrating example modules of an application framework, according to some embodiments.

FIG. 4 is a block diagram illustrating example modules of the application framework 301, according to some embodiments. The application framework 301 includes a media device service 401 executing in the application framework 301, a media device service application programming interface (API) 402, an application 403 executing in the application framework 301, and media device libraries 405. The media device service 401 provides an abstract interface between the application 403, the media devices, and the output devices so that application developers can develop applications for the client device 101 without having to know the details (e.g., device-specific syntax, device-specific protocols, device-specific APIs, etc.) of particular media devices and/or particular output devices that are coupled to the client device 101. Furthermore, the media device service 401 hides the complexity of the asynchronous actions that occur between the client device 101, the output device 102, and the media device 103 by maintaining state transitions and monitoring the progress of these asynchronous actions. The media device libraries 405 provide mappings between device-agnostic requests and device-agnostic commands received from the application 403 executing in the application framework 301 to device-specific requests and device-specific commands, respectively, for a target media device. These mappings allow application developers to call media device service functions 404 of the media device service API 402 to make requests to media devices (e.g., making device-agnostic requests to media devices) and/or to issue commands to media devices (e.g., issuing device-agnostic commands to media devices) without having to know beforehand which particular media devices a user is using or to which the user has access.

The following discussion illustrates an example process for processing requests and/or commands received from the input device 105. The application 403 receives the input events 310 and interprets the input events 310 requests and/or commands. The application 403 calls the media device service functions 404 of the media device service API 402 to issue device-agnostic request 411 and/or device-agnostic commands 412 to the media device service 401. The media device service 401 uses a media device library 405 for a target media device of device-agnostic request 411 and/or device-agnostic commands 412 to map the device-agnostic requests 411 and/or the device-agnostic commands 412 to the corresponding device-specific requests 311 and/or the corresponding device-specific commands 312, respectively. The media device service 401 then issues the device-specific requests 311 and/or the device-specific commands 312 to the control devices 303.

The media device service 401 provides the audio signals 313 and/or the video signals 314 to the application 403. The application 403 may enhance the audio signals 313 and/or the video signals 314 to produce the audio signals 315 and/or the video signals 316.

Figure 5:
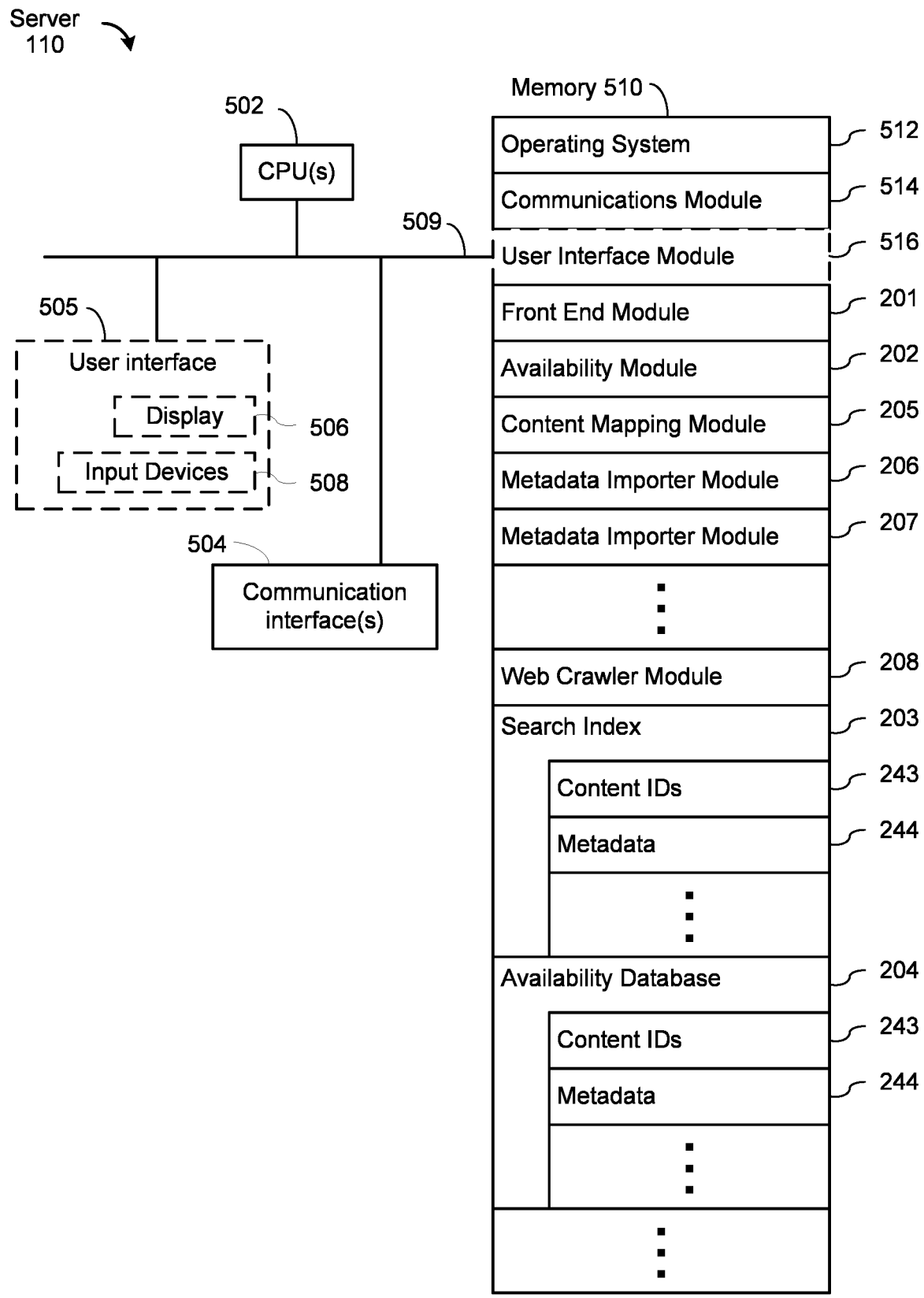
FIG. 5 is a block diagram illustrating an example server, according to some embodiments.

FIG. 5 is a block diagram illustrating the server 110, according to some embodiments. The server 110 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The server 110 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices: and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting the server 110 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- the front end module 201, as described herein;
- the availability module 202, as described herein;
- the content mapping module 205, as described herein;
- the metadata importer modules 206-207, as described herein;
- the web crawler module 208, as described herein;
- the search index 203 including the content identifiers 243 and the metadata 244 for instances of media items, as described herein; and
- the availability database 204 including the content identifiers 243 and the metadata 244 for instances of media items, as described herein.

In some embodiments, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "server," FIG. 5 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the server 110 and how features are allocated among them will vary from one implementation to another, and may depend in part on the amount of data traffic that the system must handle during peak usage periods as well as during average usage periods.

Figure 6:
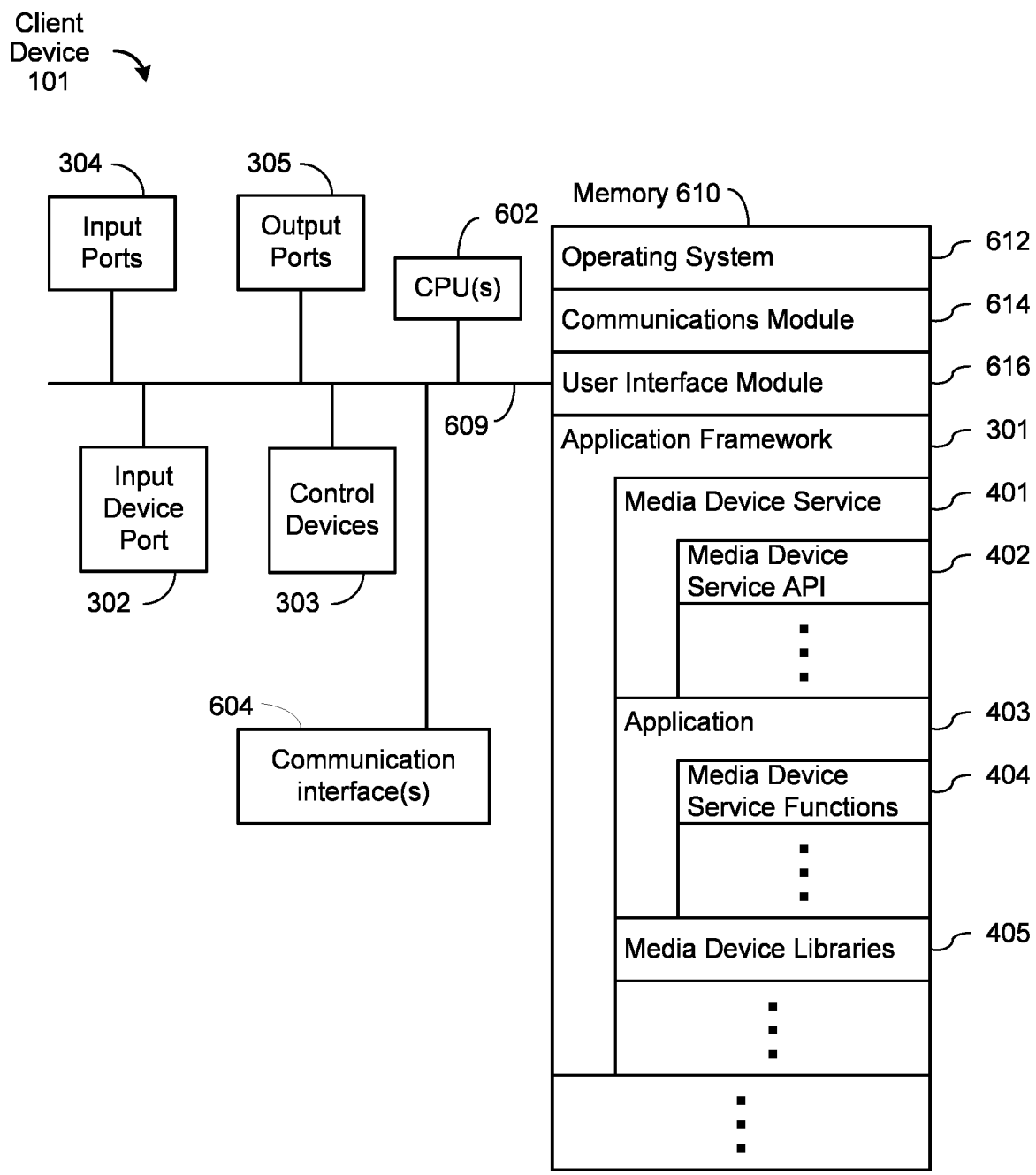
FIG. 6 is a block diagram illustrating an example client device, according to some embodiments.

FIG. 6 is a block diagram illustrating the client device 101, according to some embodiments. The client device 101 typically includes one or more processing units (CPU's, sometimes called processors) 602 for executing programs (e.g., programs stored in memory 610), one or more network or other communications interfaces 604, memory 610, the input device port 302, the control devices 303, the input ports 304, the output ports 305, and one or more communication buses 609 for interconnecting these components. The communication buses 609 may include circuitry (sometimes called a chipset) that interconnects and controls communications between system components. Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:
- an operating system 612 that includes procedures for handling various basic system services and for performing hardware dependent tasks;
- a communication module 614 that is used for connecting the client device 101 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects in a display device (e.g., the output device 102); and
- the application framework 301 including the media device service 401 itself including the media device service API 402, the application 403 itself including the media device service functions 404, and the media device libraries 405, as described herein.

In some embodiments, the programs or modules identified above correspond to sets instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "client device," FIG. 6 is intended more as a functional description of the various features which may be present in a client device than as a structural schematic of the embodiments described herein. In practice, and as recognized by those of ordinary skill in the art, items shown separately could be combined and some items could be separated.

Identifying Availability of Media Items

Figure 7:
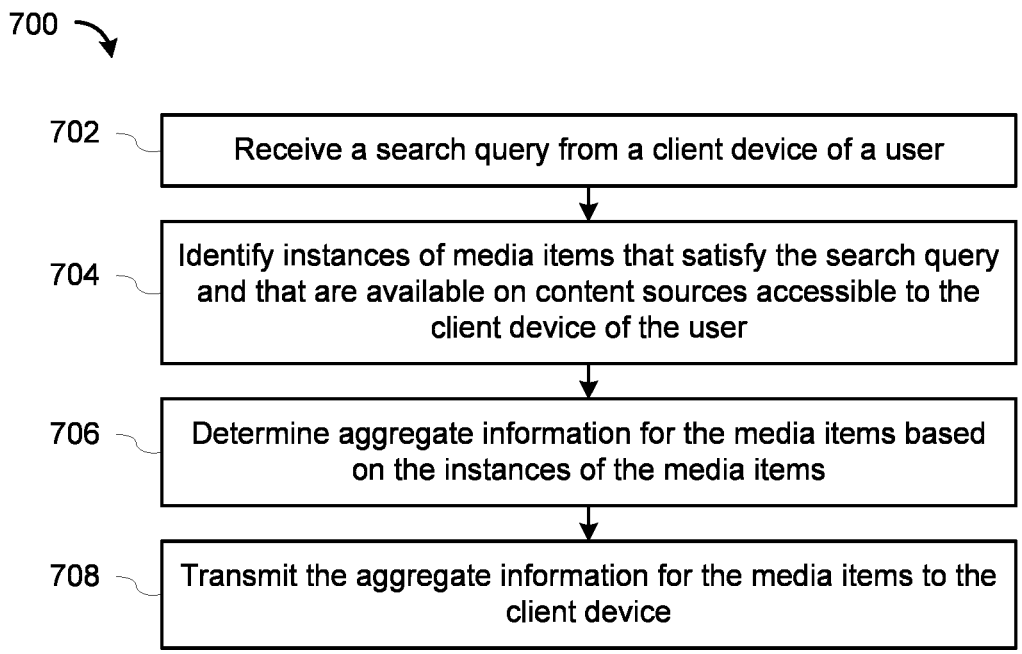
FIG. 7 is a flowchart of a method for identifying availability of media items, according to some embodiments.

FIG. 7 is a flowchart of a method 700 for identifying availability of media items, according to some embodiments. The front end module 201 receives (702) a search query from the client device 101 of the user 106.

The availability module 202 identifies (704) instances of media items that satisfy the search query and that are available on content sources accessible to the client device 101 of the user 106. Operation 702 is described in more detail below with reference to FIG. 8.

In some embodiments, prior to identifying the instances of media items that satisfy the search query and that are available on the content sources accessible to the client device of the user, the availability module 202 receives (e.g., via the front end module) information relating to the content sources accessible to the client device 101 of the user 106 from the client device 101 of the user 106. For example, the client device 101 of the user 106 may transmit the content sources accessible to the client device 101 along with the search query.

Figure 22:
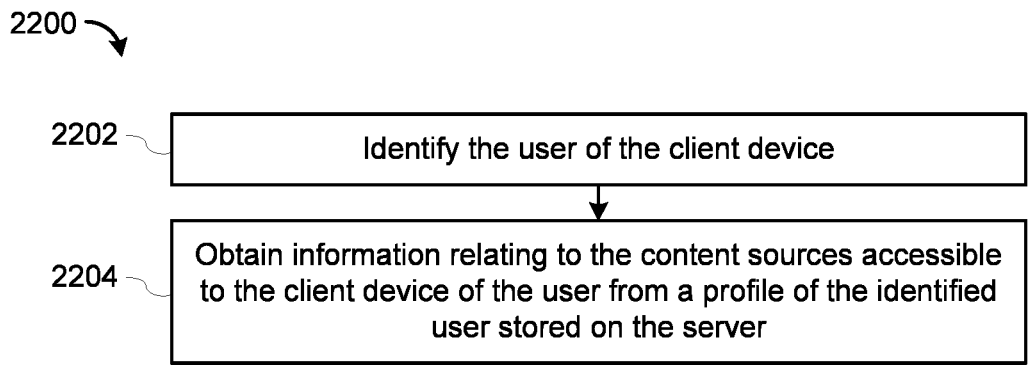
FIG. 22 is a flowchart of a method for obtaining information relating to content sources accessible to a client device of a user, according to some embodiments.

In some embodiments, prior to identifying the instances of media items that satisfy the search query and that are available on the content sources accessible to the client device of the user, the availability module 202 obtains information relating to the content sources accessible to the client device 101 of the user 106 from a profile of the user 106 and/or a profile of the client device 101. FIG. 22 is a flowchart of a method 2200 for obtaining information relating to content sources accessible to a client device of a user, according to some embodiments. The availability module 202 identifies (2202) the user 106 of the client device 101 and obtains (2204) information relating to the content sources accessible to the client device of the user from a profile of the identified user stored on the server. For example, the availability module 202 may obtain and use a user identifier of the user 106 to obtain the information relating to the content sources accessible to the client device 101 of the user 106 from a profile of the user 106. Alternatively, the availability module 202 may obtain and use a MAC address or an IP address of the client device 101 to obtain the information relating to the content sources accessible to the client device 101 of the user 106 from a profile of the user 106 associated with the MAC address or the IP address of the client device 101.

Returning to FIG. 7, the availability module 202 determines (706) aggregate information for the media items based on the instances of the media items. Operation 706 is described in more detail below with reference to FIGS. 12-21 and 23-28.

The availability module 202 transmits (708) the aggregate information for the media items to the client device 101 (e.g., via the front end module 201). In some embodiments, at least a portion of the aggregate information is displayed in a search bar in a user interface of the client device 101 of the user 106. For example, FIGS. 23-28 illustrate example GUIs illustrating various techniques for displaying the aggregate information in the search bar.

Figure 8:
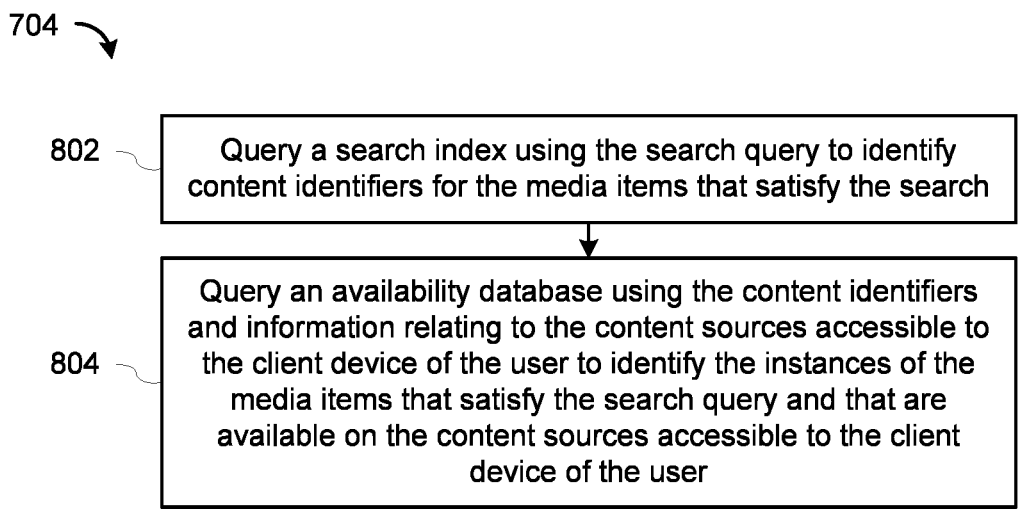
FIG. 8 is a flowchart of a method for identifying instances of the media items that satisfy a search query and that are available on the content sources accessible to the client device of a user, according to some embodiments.

FIG. 8 is a flowchart of a method for identifying (704) instances of the media items that satisfy a search query and that are available on the content sources accessible to the client device of a user, according to some embodiments. The availability module 202 queries (802) the search index 203 using the search query to identify content identifiers for the media items that satisfy the search query. The availability module 202 then queries (804) the availability database 204 using the content identifiers and information relating to the content sources accessible to the client device 101 of the user 106 to identify the instances of the media items that satisfy the search query and that are available on the content sources accessible to the client device 101 of the user 106.

In some embodiments, prior to querying the search index 203 using the search query to identify the content identifiers for the media items that satisfy the search query, the content mapping module 205 generates the search index 203 and the availability data 204. These embodiments are described below with reference to FIGS. 9-11.

Figure 9:
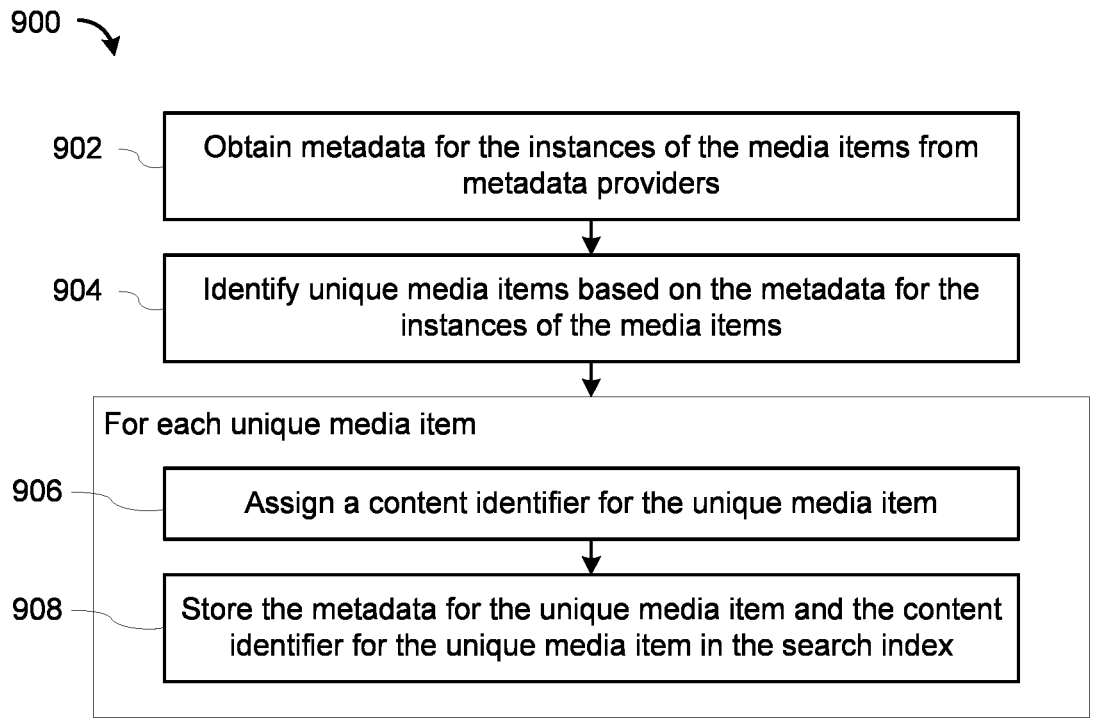
FIG. 9 is a flowchart of a method for storing metadata for a unique media item and a content identifier for the unique media item in a search index, according to some embodiments.

FIG. 9 is a flowchart of a method 900 for storing metadata for a unique media item and a content identifier for the unique media item in the search index 203, according to some embodiments. The content mapping module 205 obtains (902) metadata 240 and 241 for the instances of the media items from metadata providers 111 and 220 (and/or metadata for the instances of the media items from web pages 221 via the web crawler module 208).

The content mapping module 205 identifies (904) unique media items based on the metadata for the instances of the media items. For each unique media item, the content mapping module 205 assigns (906) a content identifier for the unique media item and stores (908) the metadata for the unique media item and the content identifier for the unique media item in the search index 203.

Figure 10:
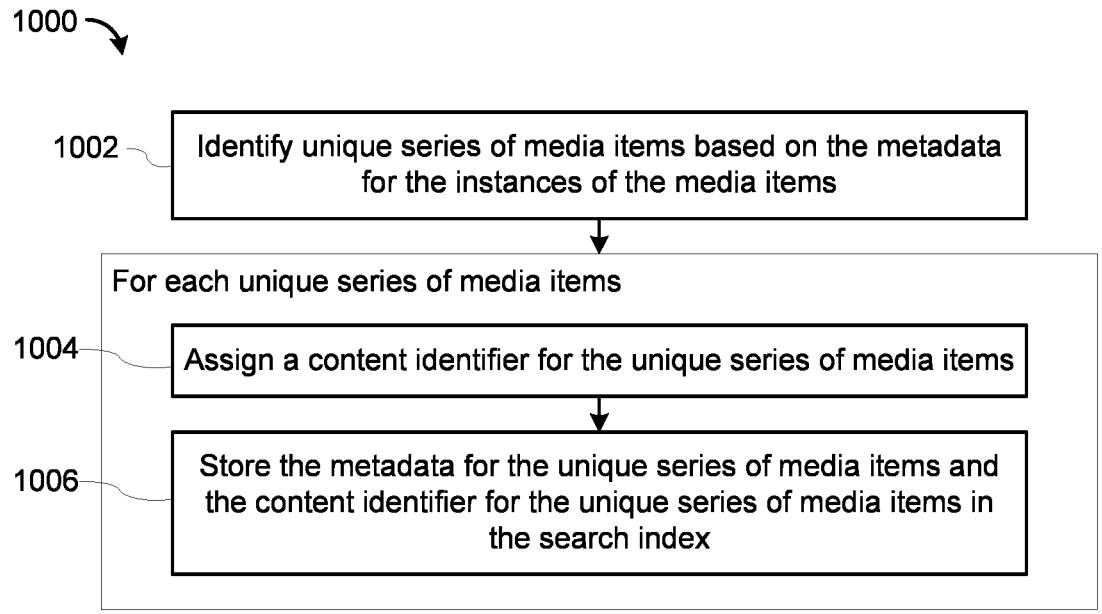
FIG. 10 is a flowchart of a method for storing metadata for a unique series of media items and a content identifier for the unique series of media items in a search index, according to some embodiments.

FIG. 10 is a flowchart of a method 1000 for storing metadata for a unique series of media items (e.g., a television series, etc.) and a content identifier for the unique series of media items in a search index 203, according to some embodiments. The content mapping module 205 identifies (1002) unique series of media items based on the metadata for the instances of the media items. For each unique series of media items, the content mapping module 205 assigns (1004) a content identifier for the unique series of media items and stores (1006) the metadata for the unique series of media items and the content identifier for the unique series of media items in the search index 203.

Figure 11:
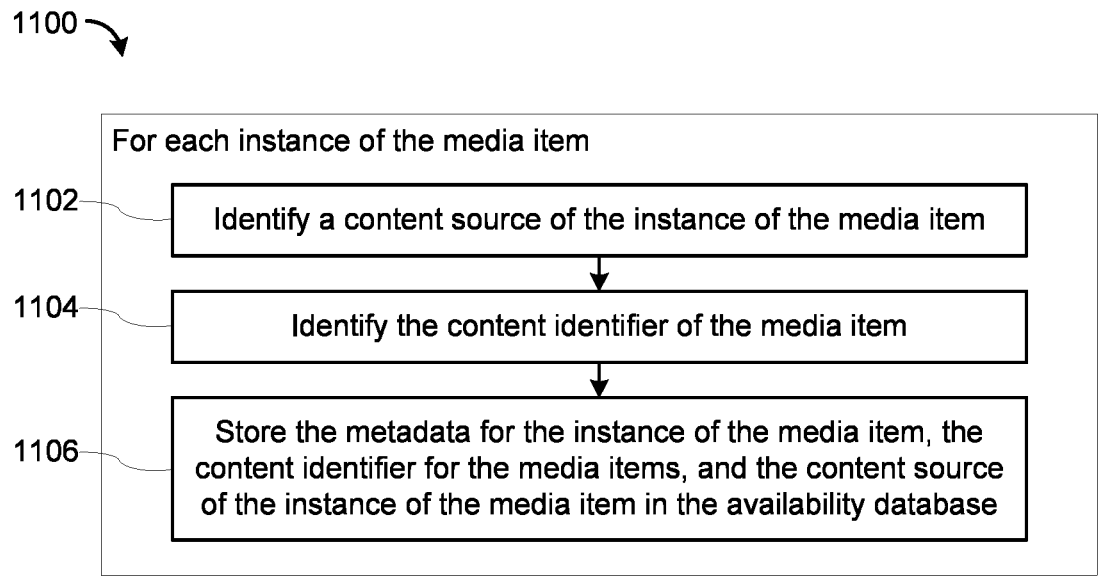
FIG. 11 is a flowchart of a method for storing metadata for an instance of a media item, a content identifier for the media items, and a content source of the instance of the media item in an availability database, according to some embodiments.

FIG. 11 is a flowchart of a method 1100 for storing metadata for an instance of a media item, a content identifier for the media items, and a content source of the instance of the media item in the availability database 204, according to some embodiments. For each instance of the media item, the content mapping module 205 identifies (1102) a content source of the instance of the media item, identifies (1104) the content identifier of the media item, and stores (1106) the metadata for the instance of the media item, the content identifier for the media items, and the content source of the instance of the media item in the availability database 204.

Determining Aggregate Information

As discussed above, the availability module 201 may generate various types of aggregate information based on the instances of the media items. FIGS. 12-21 illustrate examples of a number of types of aggregate information. FIGS. 23-28 illustrate the presentation of the aggregate information on GUIs 2300-2800 of the client device 101 in response to the user 106 entering a search query including a search term "Simpsons" into a search box of the GUIs 2300-2800.

FIGS. 12-15 relate to the determination of aggregate information for media items in a series of related media items.

Figure 12:
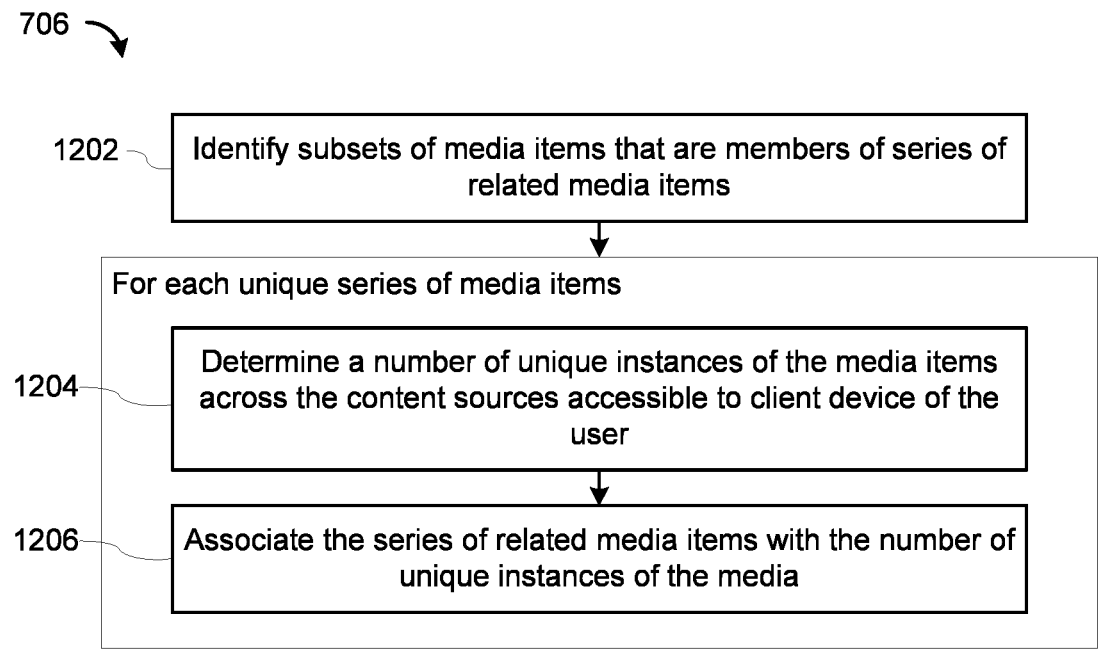
FIG. 12 is a flowchart of a method for determining a number of unique instances of media items across content sources accessible to a client device of a user, according to some embodiments.
Figure 23:
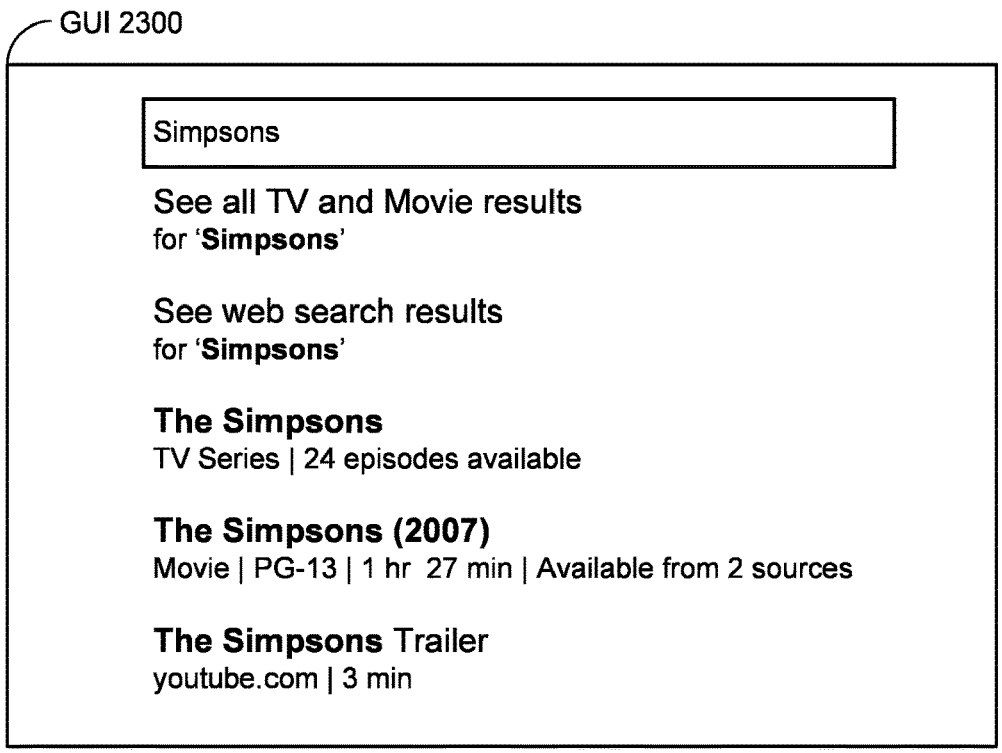
FIG. 23 is a screenshot of an example graphical user interface, according to some embodiments.

FIG. 12 is a flowchart of a method for determining (706) a number of unique instances of media items across content sources accessible to a client device of a user, according to some embodiments. The availability module 201 identifies (1202) subsets of media items that are members of a series of related media items. For each series of related media items, the availability module 201 determines (1204) a number of unique instances of the media items across the content sources accessible to the client device of the user and associates (1206) the series of related media items with the number of unique instances of the media. For example, in response to a search query including a search term "Simpsons," the availability module 201 may determine that "The Simpsons" television series has 24 unique episodes available on content sources accessible to the client device 101. The client device 101 may display this aggregate information as illustrated in FIG. 23.

Figure 13:
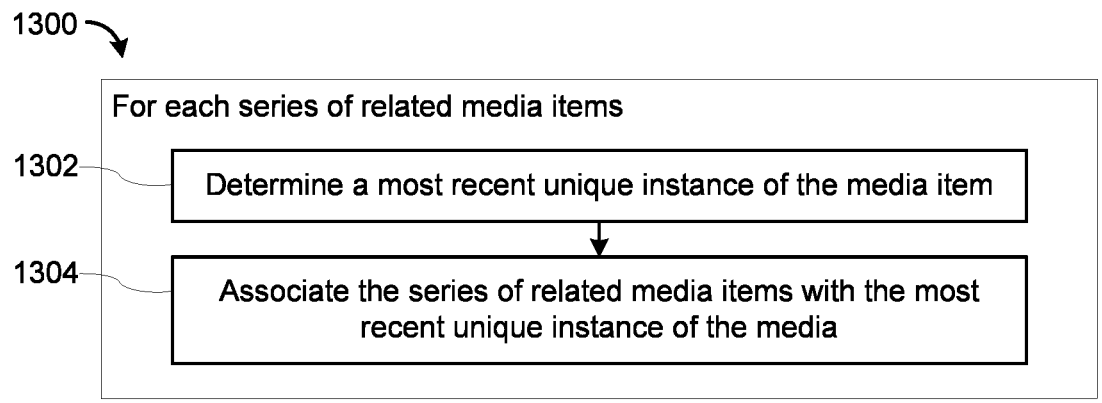
FIG. 13 is a flowchart of a method for determining a most recent unique instance of a media item, according to some embodiments.
Figure 24:
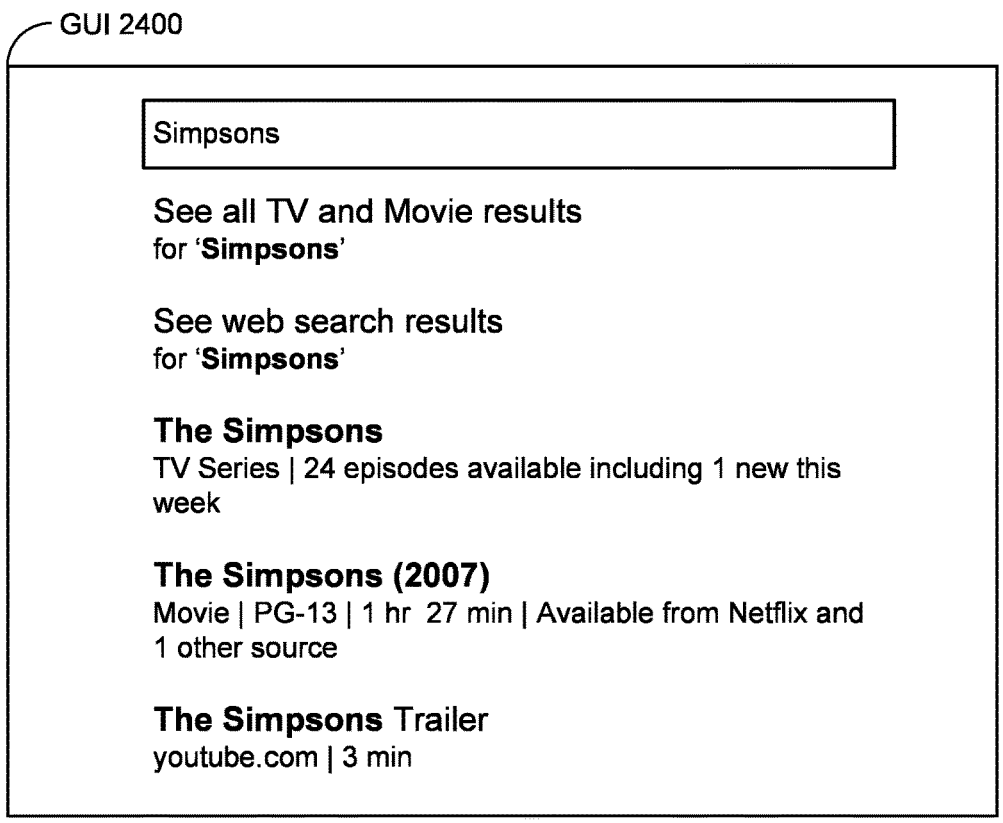
FIG. 24 is a screenshot of an example graphical user interface, according to some embodiments.

FIG. 13 is a flowchart of a method 1300 for determining a most recent unique instance of a media item, according to some embodiments. For each series of related media items, the availability module 201 determines (1302) a most recent unique instance of the media item and associates (1304) the series of related media items with the most recent unique instance of the media item. For example, in response to a search query including a search term "Simpsons," the availability module 201 may determine that "The Simpsons" television series has 24 unique episodes including one new episode this week that are available on content sources accessible to the client device 101. The client device 101 may display this aggregate information as illustrated in FIG. 24.

Figure 14:
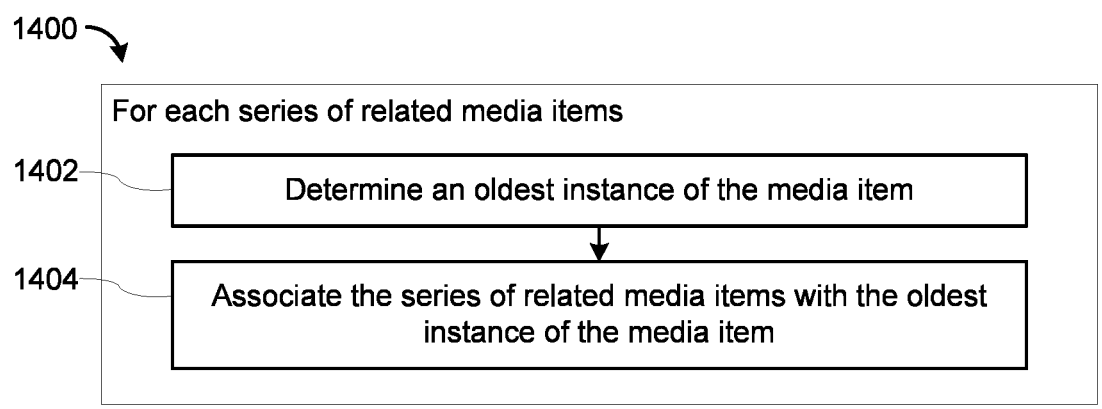
FIG. 14 is a flowchart of a method for determining an oldest instance of a media item, according to some embodiments.
Figure 25:
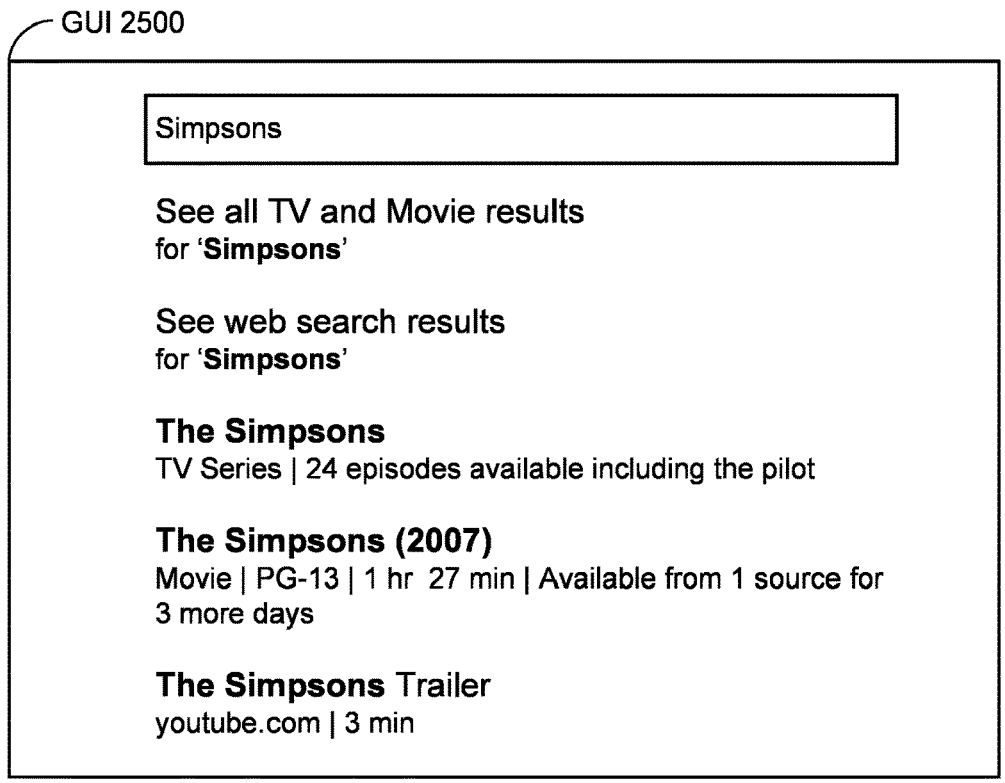
FIG. 25 is a screenshot of an example graphical user interface, according to some embodiments.

FIG. 14 is a flowchart of a method 1400 for determining an oldest instance of a media item, according to some embodiments. For each series of related media items, the availability module 201 determines (1402) an oldest instance of the media item and associates (1404) the series of related media items with the oldest instance of the media item. For example, in response to a search query including a search term "Simpsons," the availability module 201 may determine that "The Simpsons" television series has 24 unique episodes including the pilot episode that are available on content sources accessible to the client device 101. The client device 101 may display this aggregate information as illustrated in FIG. 25.

Figure 15:
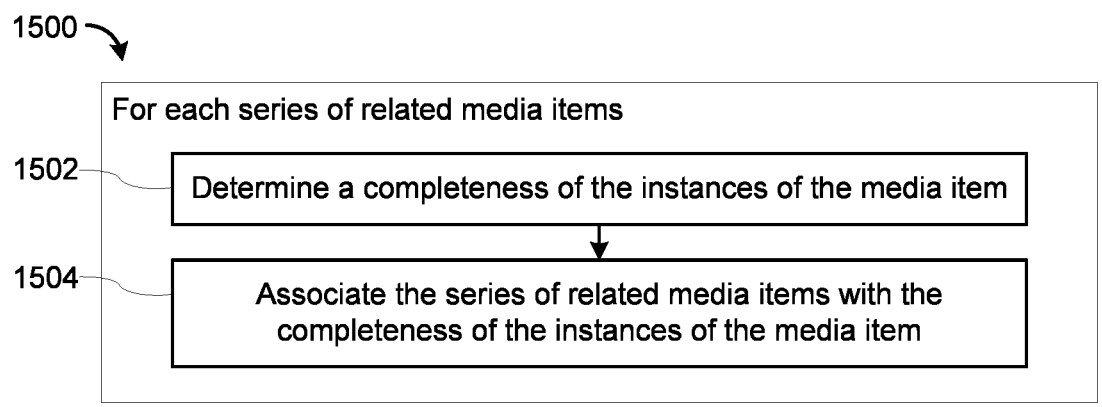
FIG. 15 is a flowchart of a method for determining a completeness of instances of a media item, according to some embodiments.
Figure 26:
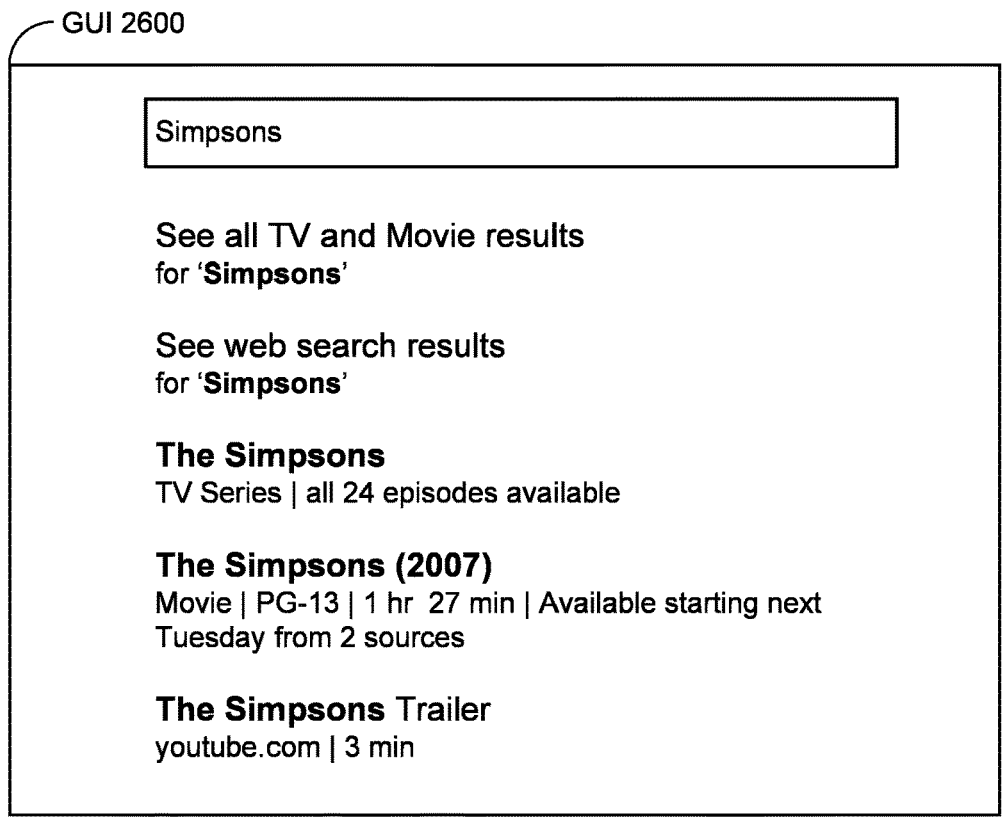
FIG. 26 is a screenshot of an example graphical user interface, according to some embodiments.

FIG. 15 is a flowchart of a method 1500 for determining a completeness of instances of a media item, according to some embodiments. For each series of related media items, the availability module 201 determines (1502) a completeness of the instances of the media item and associates (1504) the series of related media items with the completeness of the instances of the media item. For example, in response to a search query including a search term "Simpsons," the availability module 201 may determine that all 24 unique episodes of "The Simpsons" television series are available on content sources accessible to the client device 101. The client device 101 may display this aggregate information as illustrated in FIG. 26.

FIGS. 16-21 relate to the determination of aggregate information for individual media items.

Figure 16:
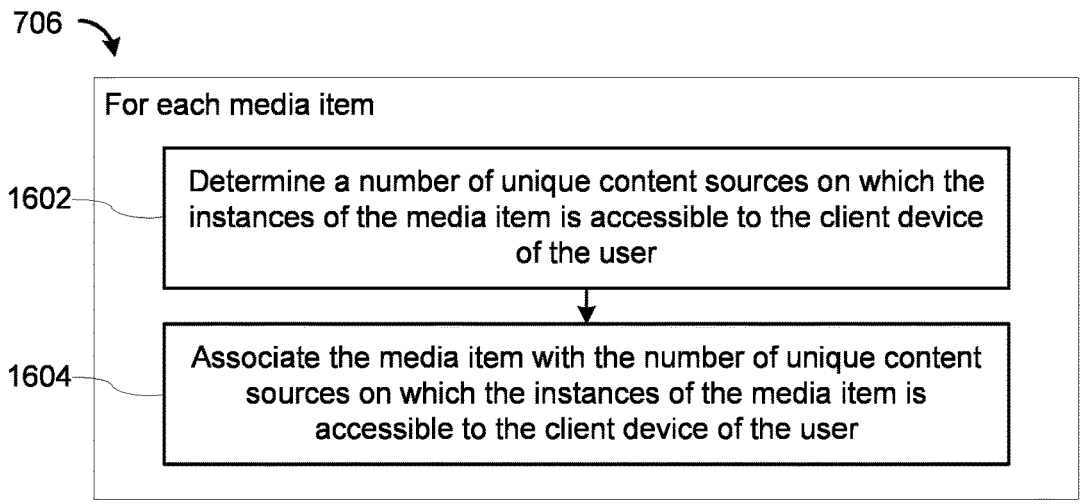
FIG. 16 is a flowchart of a method for determining a number of unique content sources on which instances of a media item is accessible to a client device of a user, according to some embodiments.

FIG. 16 is a flowchart of a method 1600 for determining a number of unique content sources on which instances of a media item is accessible to a client device of a user, according to some embodiments. For each media item, the availability module 201 determines (1602) a number of unique content sources on which the instances of the media item are accessible to the client device of the user and associates (1604) the media item with the number of unique content sources on which the instances of the media item is accessible to the client device of the user. For example, in response to a search query including a search term "Simpsons," the availability module 201 may determine that "The Simpsons (2009)" movie is available on two content sources accessible to the client device 101. The client device 101 may display this aggregate information as illustrated in FIG. 23.

Figure 17:
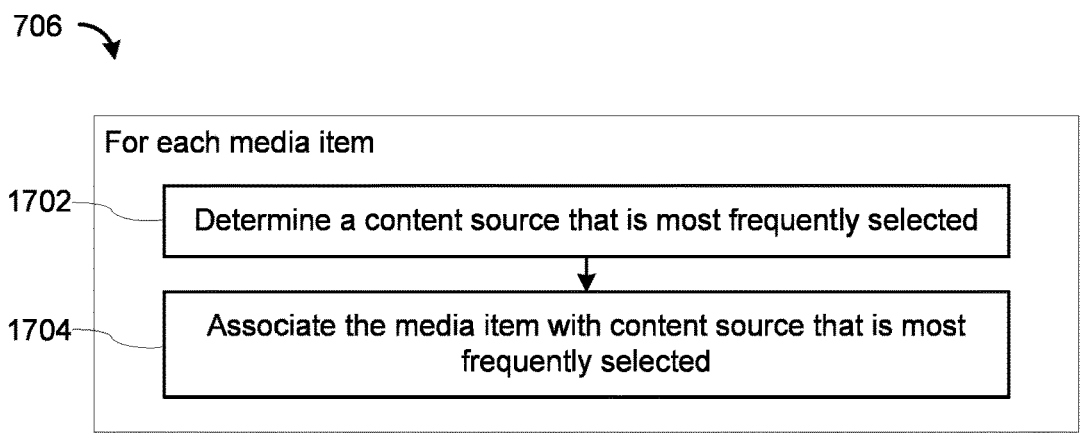
FIG. 17 is a flowchart of a method for determining a content source that is most frequently selected for a media item, according to some embodiments.

FIG. 17 is a flowchart of a method 1700 for determining a content source that is most frequently selected for a media item, according to some embodiments. For each media item, the availability module 201 determines (1702) a content source that is most frequently selected (e.g., by users) and associates (1704) the media item with the content source that is most frequently selected. For example, in response to a search query including a search term "Simpsons," the availability module 201 may determine that "The Simpsons (2009)" movie is available on "Netflix and 1 other" content source accessible to the client device 101. The client device 101 may display this aggregate information as illustrated in FIG. 24.

Figure 18:
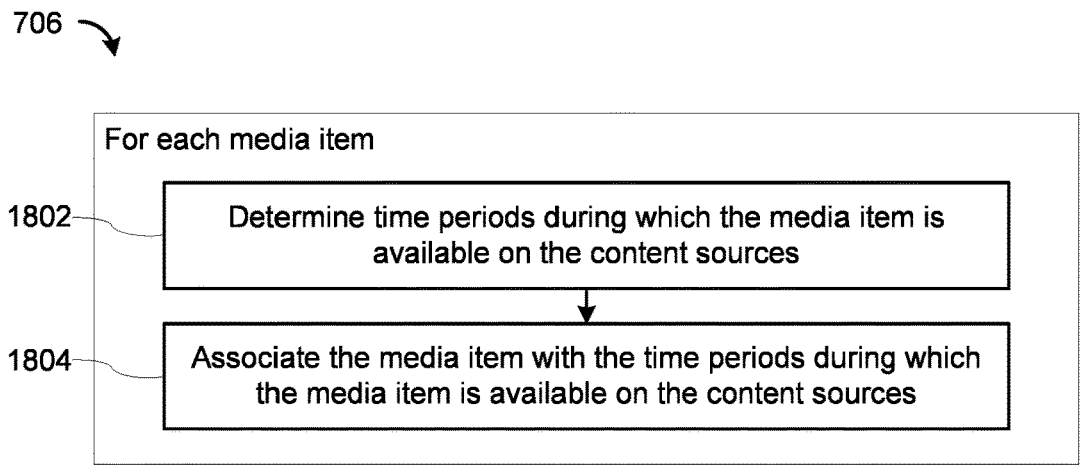
FIG. 18 is a flowchart of a method for determining time periods during which a media item is available on content sources, according to some embodiments.

FIG. 18 is a flowchart of a method 1800 for determining time periods during which a media item is available on content sources, according to some embodiments. For each media item, the availability module 201 determines (1802) time periods during which the media item is available on the content sources and associates (1804) the media item with the time periods during which the media item is available on the content sources. For example, in response to a search query including a search term "Simpsons," the availability module 201 may determine that "The Simpsons (2009)" movie is available on one content source accessible to the client device 101 for 3 more days. The client device 101 may display this aggregate information as illustrated in FIG. 25.

Figure 19:
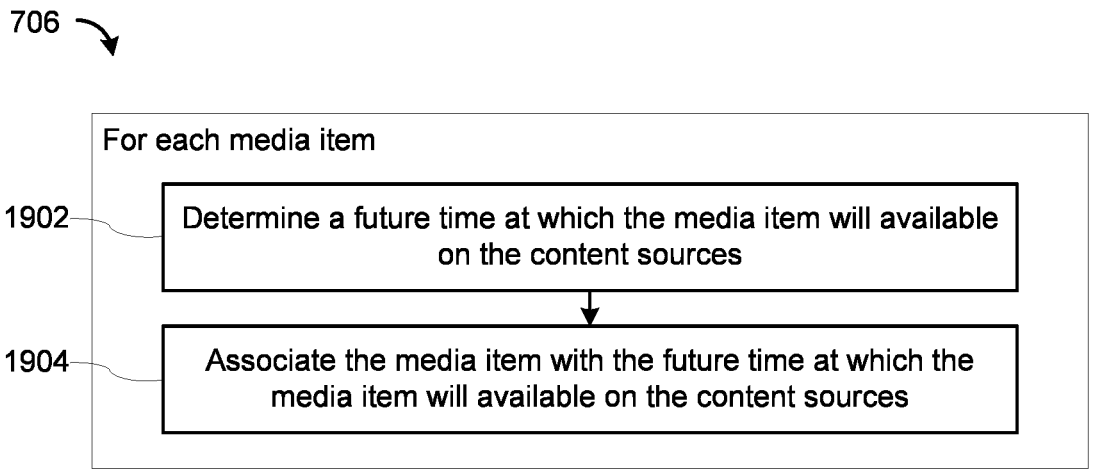
FIG. 19 is a flowchart of a method for determining a future time at which a media item will be available on content sources, according to some embodiments.

FIG. 19 is a flowchart of a method 1900 for determining a future time at which a media item will be available on content sources, according to some embodiments. For each media item, the availability module 201 determines (1902) a future time at which the media item will be available on the content sources and associates (1904) the media item with the future time at which the media item will be available on the content sources. For example, in response to a search query including a search term "Simpsons," the availability module 201 may determine that "The Simpsons (2009)" movie is available on two content sources accessible to the client device 101 starting next Tuesday. The client device 101 may display this aggregate information as illustrated in FIG. 26.

Figure 20:
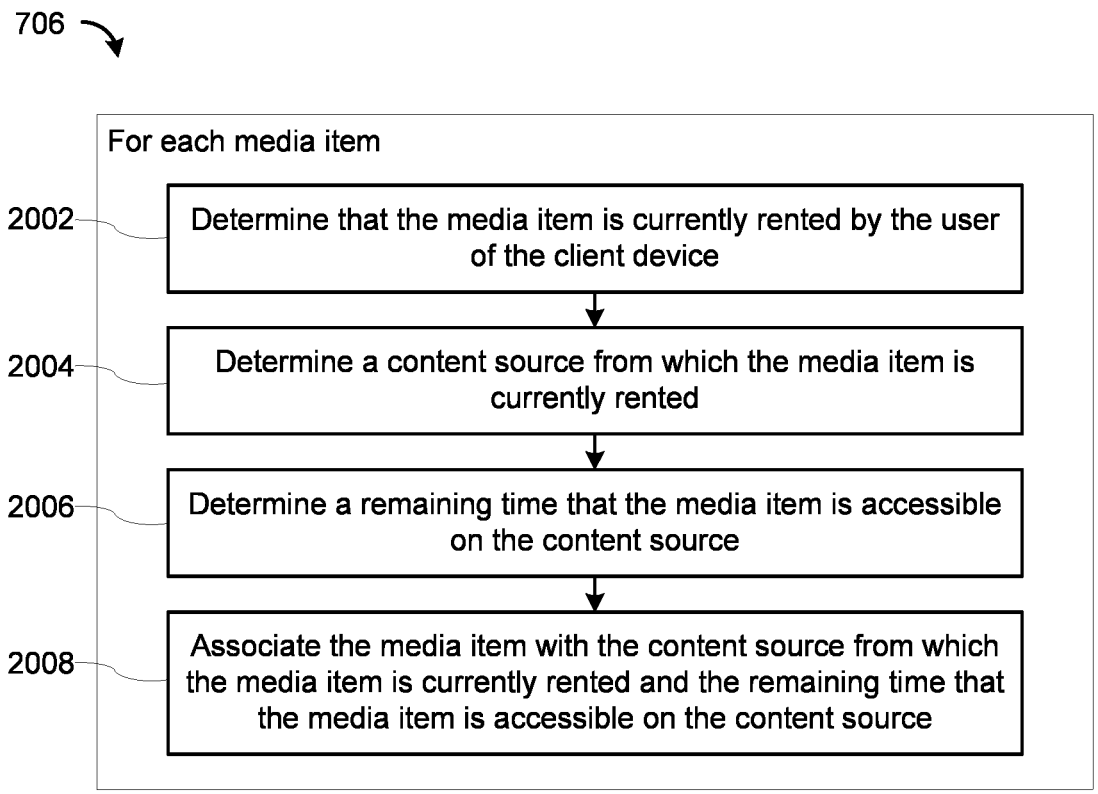
FIG. 20 is a flowchart of a method for determining a remaining time that a media item is accessible on a content source, according to some embodiments.
Figure 27:
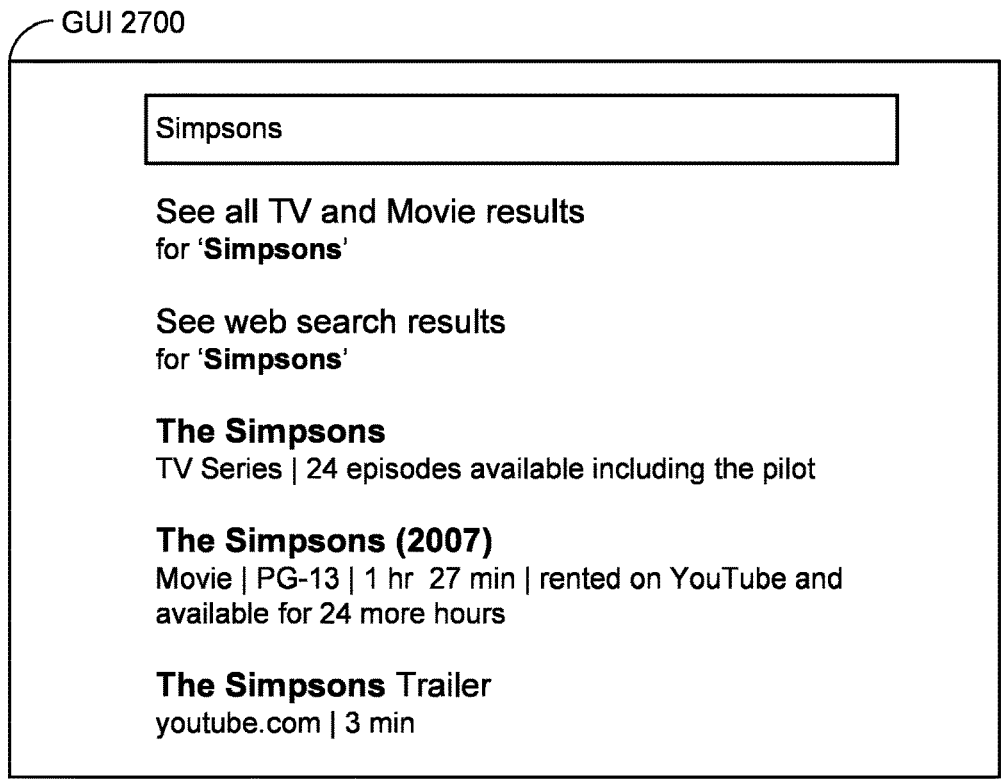
FIG. 27 is a screenshot of an example graphical user interface, according to some embodiments.

FIG. 20 is a flowchart of a method 2000 for determining a remaining time that a media item is accessible on a content source, according to some embodiments. For each media item, the availability module 201 determines (2002) that the media item is currently rented by the user 106 of the client device 101, determines (2004) a content source from which the media item is currently rented, determines (2006) a remaining time that the media item is accessible on the content source, and associates (2008) the media item with the content source from which the media item is currently rented and the remaining time that the media item is accessible on the content source. For example, in response to a search query including a search term "Simpsons," the availability module 201 may determine that "The Simpsons (2009)" was rented by the user 106 on YouTube (e.g., a content source accessible to the client device 101) and is available for 36 more hours. The client device 101 may display this aggregate information as illustrated in FIG. 27.

Figure 21:
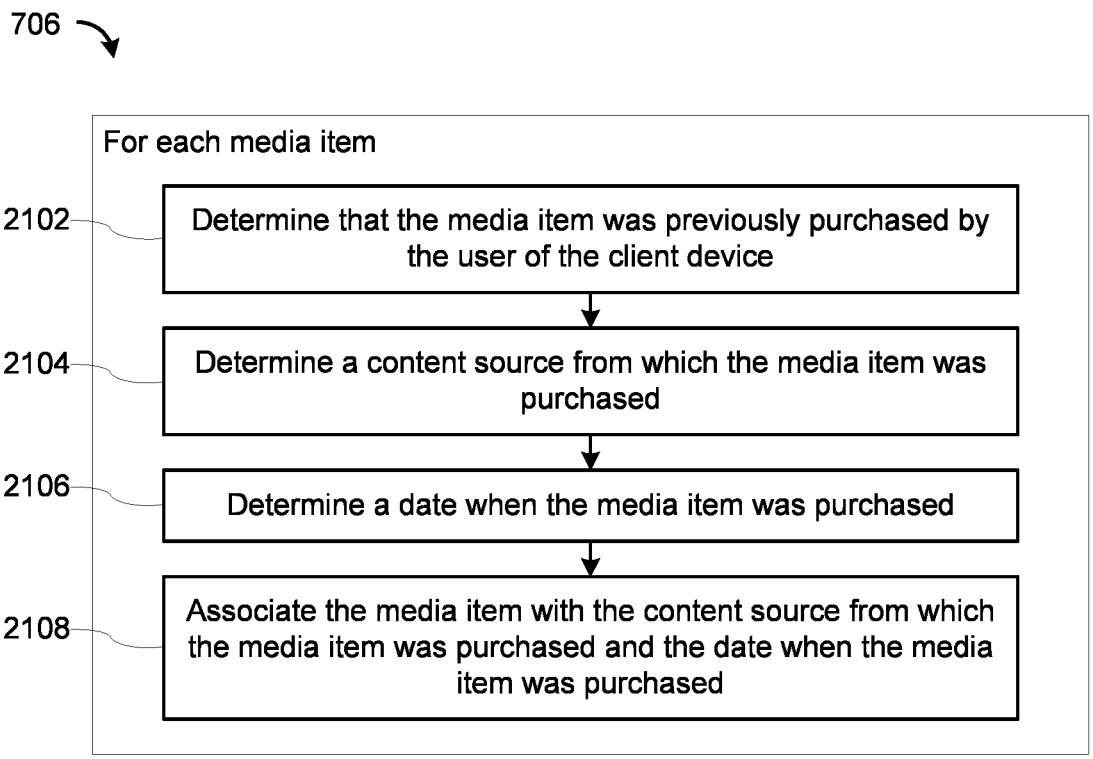
FIG. 21 is a flowchart of a method for determining a date when a media item was previously purchased, according to some embodiments.
Figure 28:
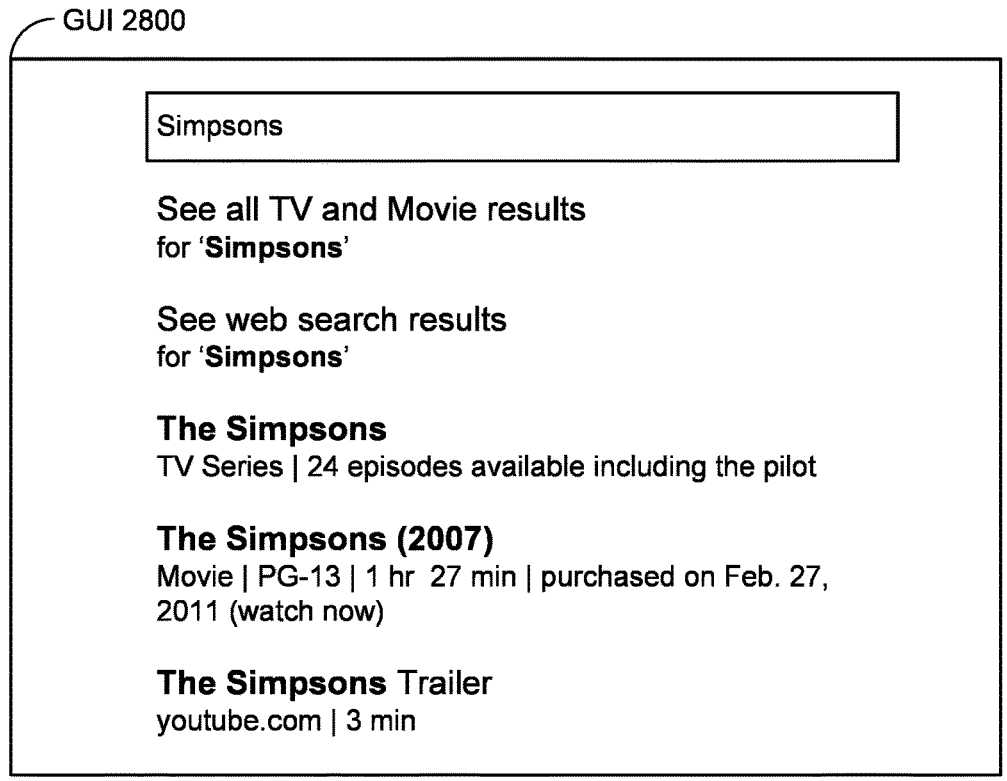
FIG. 28 is a screenshot of an example graphical user interface, according to some embodiments.

FIG. 21 is a flowchart of a method 2100 for determining a date when a media item was previously purchased, according to some embodiments. For each media item, the availability module 201 determines (2102) that the media item was previously purchased by the user 106 of the client device 101, determines (2104) a content source from which the media item was purchased, determines (2106) a date when the media item was purchased, and associates (2108) the media item with the content source from which the media item was purchased and the date when the media item was purchased. For example, in response to a search query including a search term "Simpsons," the availability module 201 may determine that "The Simpsons (2009)" was purchased by the user 106 on Feb. 27, 2011, and is available to watch on a content source accessible to the client device 101). The client device 101 may display this aggregate information as illustrated in FIG. 28.

The methods illustrated in FIGS. 7-22 may be governed by instructions that are stored in a computer readable storage medium and that are executed by one or more processors of the server 110. Each of the operations shown in FIGS. 7-22 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for identifying availability of media items, the method comprising:
receiving information relating to content sources accessible to a client device of a user, wherein the content sources accessible to the client device are content sources for which the client device has a subscription or from which the client device has purchased rights;
receiving a search query from the client device;
identifying instances of media items that satisfy the search query by querying an index of media items;
filtering the instances of the media items that satisfy the search query to determine a subset of the instances that are available on the content sources accessible to the client device by querying an availability database using content identifiers of the instances to determine content sources for which the client device has a subscription or has purchased rights; and
transmitting information associated with the subset of the instances of the media items to the client device.

2. The computer-implemented method of claim 1, wherein identifying the instances of the media items that satisfy the search query and that are available on the content sources accessible to the client device includes querying a search index using the search query to identify the content identifiers for the media items that satisfy the search query.

3. The computer-implemented method of claim 2, wherein prior to querying the search index using the search query to identify the content identifiers for the media items that satisfy the search query, the computer-implemented method further comprises:
obtaining metadata for the instances of the media items from metadata providers;
identifying unique media items based on the metadata for the instances of the media items; and
for each unique media item:
assigning a content identifier for the unique media item; and
storing the metadata for the unique media item and the content identifier for the unique media item in the search index.

4. The computer-implemented method of claim 3, wherein the computer-implemented method further comprises:
identifying at least a unique series of media items based on the metadata for the instances of the media items; and
for each unique series of media items:
assigning a content identifier for the unique series of media items; and
storing the metadata for the unique series of media items and the content identifier for the unique series of media items in the search index.

5. The computer-implemented method of claim 3, wherein the computer-implemented method further comprises:
for each instance of a unique media item:
identifying a content source of the instance of the media item;
identifying the content identifier of the unique media item; and
storing the metadata for the instance of the media item, the content identifier for the unique media item, and the content source of the instance of the media item in the availability database.

6. The computer-implemented method of claim 2, wherein prior to identifying the instances of media items that satisfy the search query and that are available on the content sources accessible to the client device of the user, the computer-implemented method includes:
identifying, on a server, a profile of the user of the client device; and
obtaining information relating to the content sources accessible to the client device from the profile.

7. The computer-implemented method of claim 1, wherein transmitting the information associated with the identified instances of the media items to the client device includes:
determining aggregate information for the media items based on the instances of the media items; and
transmitting the aggregate information for the media items to the client device.

8. The computer-implemented method of claim 7, wherein determining the aggregate information for the media items based on the instances of the media items includes:
identifying a subset of media items that are members of a series of related media items;
determining a number of unique instances of the media items that are members of the series across the content sources accessible to the client device of the user; and
associating the series with the number of unique instances.

9. The computer-implemented method of claim 8, further comprising:
   determining a most recent unique instance of the media items that are members of the series; and
   associating the series with the most recent unique instance.

10. The computer-implemented method of claim 8, further comprising:
    determining an oldest instance of the media items that are members of the series; and
    associating the series with the oldest instance.

11. The computer-implemented method of claim 8, further comprising:
    determining a completeness of the instances of the media item; and
    associating the series with the completeness.

12. The computer-implemented method of claim 7, wherein determining the aggregate information for the media items based on the instances of the media items, includes:
    for each media item:
       determining a number of unique content sources on which the instances of the media item are accessible to the client device of the user; and
       associating the media item with the number of unique content sources on which the instances of the media item are accessible to the client device of the user.

13. The computer-implemented method of claim 7, wherein determining the aggregate information for the media items based on the instances of the media items includes:
    for each media item:
       determining a content source that is most frequently selected; and
       associating the media item with the content source that is most frequently selected.

14. The computer-implemented method of claim 7, wherein determining the aggregate information for the media items based on the instances of the media items includes:
    for each media item:
       determining time periods during which the media item is available on the content sources; and
       associating the media item with the time periods during which the media item is available on the content sources.

15. The computer-implemented method of claim 7, wherein determining the aggregate information for the media items based on the instances of the media items includes:
    for each media item:
       determining a future time at which the media item will be available on the content sources; and
       associating the media item with the future time at which the media item will be available on the content sources.

16. The computer-implemented method of claim 7, wherein determining the aggregate information for the media items based on the instances of the media items includes:
    for each media item:
       determining that the media item is currently rented by the user of the client device;
       determining a content source from which the media item is currently rented;
       determining a remaining time that the media item is accessible on the content source; and
       associating the media item with the content source from which the media item is currently rented and the remaining time that the media item is accessible on the content source.

17. The computer-implemented method of claim 7, wherein determining the aggregate information for the media items based on the instances of the media items includes:
    for each media item:
       determining that the media item was previously purchased by the user of the client device;
       determining a content source from which the media item was purchased;
       determining a date when the media item was purchased; and
       associating the media item with the content source from which the media item was purchased and the date when the media item was purchased.

18. The computer-implemented method of claim 7, wherein at least a portion of the aggregate information is displayed in a search bar in a user interface of the client device of the user.

19. A system for identifying availability of media items, comprising:
    at least one processor;
    memory; and
    at least one program stored in the memory and executable by the at least one processor, the at least one program comprising instructions to:
       receive information relating to content sources accessible to a client device of a user wherein the content sources accessible to the client device are content sources for which the client device has a subscription or from which the client device has purchased rights;
       receive a search query from the client device;
       identify instances of media items that satisfy the search query by querying an index of media items;
       filter the instances of the media items that satisfy the search query to determine a subset of the instances that are available on the content sources accessible to the client device by querying an availability database using content identifiers of the instances to determine content sources for which the client device has a subscription or has purchased rights; and
       transmit information associated with the subset of the instances of the media items to the client device.

20. A non-transitory computer-readable medium containing computer executable instructions that, when executed by a processor, cause the processor to perform a method for identifying availability of media items, the method comprising:
    receiving information relating to content sources accessible to a client device of a user wherein the content sources accessible to the client device are content sources for which the client device has a subscription or from which the client device has purchased rights;
    receiving a search query from the client device;
    identifying instances of media items that satisfy the search query by querying an index of media items;
    filtering the instances of the media items that satisfy the search query to determine a subset of the instances that are available on the content sources accessible to the client device by querying an availability database using content identifiers of the instances to determine content sources for which the client device has a subscription or has purchased rights; and transmitting information associated with the subset of the instances of the media items to the client device.

21. The non-transitory computer-readable medium of claim 20, wherein the information associated with the subset of the instances is configured to enable the client device to obtain the instances.

* * * * *